United States Patent
Tanaka et al.

[11] Patent Number: 5,815,696
[45] Date of Patent: Sep. 29, 1998

[54] PIPELINE PROCESSOR INCLUDING INTERRUPT CONTROL SYSTEM FOR ACCURATELY PERFORM INTERRUPT PROCESSING EVEN APPLIED TO VLIW AND DELAY BRANCH INSTRUCTION IN DELAY SLOT

[75] Inventors: Kazuhiko Tanaka, Fujisawa; Tohru Nojiri, Tokyo-to; Keiji Kojima, Sagamihara; Kiyokazu Nishioka, Odawara; Yoshiki Kurokawa, Sakai-gun, all of Japan

[73] Assignee: Hitachi, Ltd., Tokyo, Japan

[21] Appl. No.: 888,789

[22] Filed: Jul. 7, 1997

[30] Foreign Application Priority Data

Jul. 8, 1996 [JP] Japan ................................. 8-177773

[51] Int. Cl.⁶ ............................... G06F 9/38; G06F 9/30
[52] U.S. Cl. ........................................... 395/580; 395/591
[58] Field of Search ...................................... 395/580, 591

[56] References Cited

U.S. PATENT DOCUMENTS

| | | | |
|---|---|---|---|
| 4,881,196 | 11/1989 | Kodama et al. | 395/800 |
| 5,099,419 | 3/1992 | Nomura | 395/580 |
| 5,287,522 | 2/1994 | Brown et al. | 395/391 |
| 5,566,338 | 10/1996 | Kodama et al. | 395/733 |
| 5,579,525 | 11/1996 | Suzuki | 395/800 |

FOREIGN PATENT DOCUMENTS 5-143363  6/1993  Japan .

*Primary Examiner*—Krisna Lim
*Attorney, Agent, or Firm*—Kenyon & Kenyon

[57] ABSTRACT

There is provided an instruction supply unit 20 for generating addresses for each instruction when an interrupt occurs, from an interrupted instruction until an instruction to be executed later by the number of instructions contained in a delay slot of the instruction an interrupt control unit 50 for storing each address thus generated, and an instruction executing unit 30 for successively reading out each of the stored addresses from the address of the interrupted address after the interrupt processing is completed. The instruction executing unit 30 executes a branch instruction to the address which is first read out. Thereafter, with respect to the addresses which are read out secondly and subsequently, if the address is the branch destination address of the branch instruction, the instruction executing unit 30 executes the branch instruction to the address, and if the address is not the branch destination address, it executes an NOP instruction. Accordingly, even when the instruction length is not fixed, the interrupt can be accurately processed.

14 Claims, 26 Drawing Sheets

```
              LD    A, 3      (INSTRUCTION O)
              JMP   L1        (INSTRUCTION Q)
              LD    B, 4      (INSTRUCTION P)
              LD    D, 7      (INSTRUCTION R)
              LD    E, 8      (INSTRUCTION S)
                     ⋮
     L1:      LD    K, 3      (INSTRUCTION X)
              LD    J, 4      (INSTRUCTION Y)
                     ⋮
```

```
         DI                (INSTRUCTION a)
         LD    IA, EIP0    (INSTRUCTION b)
         LD    IB, EIP1    (INSTRUCTION c)
         LD    IC, EIP1V   (INSTRUCTION d)
         LD    ID, 7       (INSTRUCTION e)
                  ⋮
         CMP   IC, 0       (INSTRUCTION o)
         JNE   L2          (INSTRUCTION p)
         EI                (INSTRUCTION q)
         JMP   IA          (INSTRUCTION r)
         NOP               (INSTRUCTION s)
L2 :     JMP   IA          (INSTRUCTION t)
         JMP   IB          (INSTRUCTION u)
```

| | | |
|---|---|---|
| DI | | (INSTRUCTION a) |
| LD | ID, 7 | (INSTRUCTION e) |
| ⋮ | | |
| IRET | | (INSTRUCTION w) |
| EI | | (INSTRUCTION q) |

TIME

FIG.17

INSTRUCTION Q [ F | R | E | W ]
　INSTRUCTION P [ F | R | cancel ]
　　INSTRUCTION X [ F | cancel ]
　　　INSTRUCTION a [ F | R | E | W ]
⋱

INSTRUCTION w [ F | R | E | W ]
　　　　　　INSTRUCTION q [ F | R | E | W ]
　　　　　　　INSTRUCTION P [ F | R | E | W ]
　　　　　　　　INSTRUCTION X [ F | R | E | W ]
⋱

→ TIME

FIG.20

```
DI                      (INSTRUCTION a)
LD    IA, EIP0          (INSTRUCTION b)
LD    IB, EIP1          (INSTRUCTION c)
LD    ID, 7             (INSTRUCTION e)
         ⋮
EI                      (INSTRUCTION q)
JMP   IA                (INSTRUCTION t)
JMP   IB                (INSTRUCTION u)
```

FIG.26

```
        DI
        LD    IA, EIP0
        LD    IB, EIP1
        LD    IC EIP2
        LD    ID, EIP1V
        LD    IE, EIP2V
              ⋮
        CMP ID, 0
        JNE L1
        NOP
        NOP
        CMP IE, 0
        JNE L01
        NOP
        NOP
        JMP L00
        NOP
        NOP
L1  :   CMP IE,0
        JNE L11
        NOP
        NOP
        EI            ← FOR ID=1, IE=0
        JMP IA
        JMP IB
        NOP
L11 :   EI            ← FOR ID=1, IE=1
        JMP IA
        JMP IB
        JMP IC
L01 :   EI            ← FOR ID=0, IE=1
        JMP IA
        NOP
        JMP IC
L00 :   EI            ← FOR ID=0, IE=0
        JMP IA
        NOP
        NOP
```

```
LD    A, 3    (INSTRUCTION A)
LD    B, 4    (INSTRUCTION B)
LD    B, 5    (INSTRUCTION C)
LD    D, 7    (INSTRUCTION D)
LD    E, 8    (INSTRUCTION E)
        ⋮
```

TIME

TIME

```
         LD   A, 3     (INSTRUCTION O)
         LD   B, 4     (INSTRUCTION P)
         JMP  L1       (INSTRUCTION Q)
         LD   D, 7     (INSTRUCTION R)
         LD   E, 8     (INSTRUCTION S)
              ⋮
    L1:  LD   K, 3     (INSTRUCTION X)
         LD   J, 4     (INSTRUCTION Y)
              ⋮
```

```
        LD   A, 3    (INSTRUCTION O)
        JMP  L1      (INSTRUCTION Q)
        LD   B, 4    (INSTRUCTION P)
        LD   D, 7    (INSTRUCTION R)
        LD   E, 8    (INSTRUCTION S)
           ⋮
L1:     LD   K, 3    (INSTRUCTION X)
        LD   J, 4    (INSTRUCTION Y)
           ⋮
```

TIME

PIPELINE PROCESSOR INCLUDING INTERRUPT CONTROL SYSTEM FOR ACCURATELY PERFORM INTERRUPT PROCESSING EVEN APPLIED TO VLIW AND DELAY BRANCH INSTRUCTION IN DELAY SLOT

BACKGROUND OF THE INVENTION

1. Field of the Invention

The present invention relates to a control system when an interruption occurs, a processor using the control system, and a computer system in a pipeline type processing unit which executes a branch instruction having a delay slot.

2. Description of Related Art

In order to increase the processing speed of a processing unit, a method of establishing pipeline processing (hereinafter referred to as "pipelining") has been known. The pipelining of the processing unit will be described hereinafter with the drawings.

FIG. 28 is a diagram showing an example of a program executed by a processing unit. FIG. 29 is a diagram showing the flow of a pipeline when a processing unit adopting no pipeline system executes the program shown in FIG. 28. FIG. 30 is a diagram showing the flow of a pipeline when a processing unit using the pipeline system executes the program shown in FIG. 28.

Usually, irrespective of using a pipeline system, a processing unit executes each instruction while dividing the processing into four stages, an F stage for reading out a instruction, an R stage for decoding the read-out instruction and reading out an operand, an E stage for executing the operation, and a W stage for writing an operation result as shown in FIGS. 29 and 30. A time corresponding to one clock is needed for the execution in each stage. Accordingly, it takes four clocks to execute one instruction.

In the processing unit without a pipeline system, as shown in FIG. 29, a next instruction is executed after the execution of all the stages of an initial instruction is completed. Accordingly, when a program comprises n instructions, the time corresponding to clocks of 4n is needed for processing the program. On the other hand, in the processing unit using a pipeline system, as shown in FIG. 30, after the execution of a first F stage of the instruction is completed, the execution of a next instruction is started simultaneously with the start of the execution of the R stage of the first instruction. Accordingly, when a program comprises n instructions, the time corresponding to clocks of (n+3) is needed for processing of the program. As described above, in the pipeline type processing unit, plural instructions are executed while overlapped with one another (i.e., in parallel with one another), so that the processing speed of the program can be increased.

Nevertheless, the pipeline type processing unit's thereof program processing performance thereof is lowered when a branch instruction exists in a program. This problem will be described in detail with reference to the drawings.

FIG. 31 is a diagram showing an example of a program containing a branch instruction. Here, JMP represents a branching instruction. An instruction Q instructs the program to branch to a routine L1 comprising instructions X,Y.

FIG. 32 is a diagram showing the flow of a pipeline when the processing unit uses the pipeline system and executes the program shown in FIG. 31. Usually, the processing unit can recognize whether the instruction is a branch instruction or not by decoding the instruction, that is, by executing the R stage. In other words, the processing unit cannot make any judgment as to whether the instruction is a branch instruction if it is not at the R stage. Therefore, in the pipeline type processing unit, as shown in FIG. 32, the instruction R is executed although the instruction X at the branch destination L1 indicated by the instruction Q should be executed soon after the execution of the instruction Q. Thereafter, the execution of the instruction R is ceased at the time when the R stage of the instruction Q is executed and the instruction is judged to be a branch instruction. As described above, in the pipeline type processing unit, the instruction next to the branch instruction is erroneously executed, and thus a redundant cycle occurs, so that the program processing performance is lowered.

A delay branch is known as a method of solving the above problem. According to the delay branch method, when a branch occurs, a instruction at the branch destination is executed after some instructions subsequent to the branch instruction are executed. In general, a subsequent instruction to be executed after the branch instruction is referred to as "an instruction in a delay slot". The delay branch will be described hereinafter with the drawings.

FIG. 33 shows an example of a program containing a branch instruction having a delay slot, and FIG. 34 is a diagram showing the flow of a pipeline when a pipeline type processing unit which supports a delay branch executes the program shown in FIG. 31. In the following description, the case where one instruction in a delay slot will be described.

In the pipeline type processing unit which supports the delay branch, as shown in FIG. 34, although the R stage of the instruction Q is executed and the instruction is judged to be a branch instruction, the execution of the instruction P, which is a subsequent instruction to the branch instruction, is performed without interruption. Soon after instruction P, instruction X of the routine L1 corresponding to the branch destination indicated by instruction Q is executed. As described above, in the pipeline type processing unit supporting a delay branch, when an instruction at the branch destination is executed, a subsequent instruction to the branch instruction being executed is not stopped, and thus no redundant cycle occurs.

However, in the pipeline type processing unit supporting delay branch, when an interrupt occurs during the execution of a instruction contained in the delay slot, some idea is needed to return from the interrupt processing program. Known is a method for saving only the address value of an instruction under which an interrupt occurs. In a processing unit, when an interrupt occurs during the execution of the instruction P in the delay slot, only the address of the instruction P is saved. In this case, the address of the instruction X of the branch destination L1 indicated by the instruction Q is not saved. Therefore, after the processing returns from the interrupt processing program, the instruction P, the instruction R and the instruction S are executed in this order although the instruction P, the instruction X and the instruction Y should be executed in this order.

An interrupt processing system as disclosed in Japanese Laid-open Patent Application No. Hei-5-143363 is known as a system for solving the above problem. This system is provided with first address holding means for holding the address of a return destination from the interrupt processing program and second address holding means for holding the address of a instruction to be executed subsequently to the instruction of the return destination address from the interrupt processing program. When returning from the interrupt processing program, the processing branches to the address are held in the first address holding means, and after the execution of the instruction, the processing branches to the address are held in the second address holding means.

Through the above processing, in the case where there is one instruction in the delay slot, the instructions can be executed in a proper order after the processing returns from the interrupt processing program even when an interrupt occurs in a instruction in the delay slot.

SUMMARY OF THE INVENTION

The system disclosed in Japanese Laid-open Patent Application No. Hei-5-143363 is established on the assumption that a RISC (Reduced Instruction Set Computer) whose instruction length is fixed is used. That is, when an interrupt occurs in an instruction other than the instructions in the delay slot, by utilizing the characteristic that the instruction length is fixed, a predetermined instruction length is added to the address of an instruction which is saved in the first address holding means and in which an interrupt occurs, thereby calculating the address to be saved in the second address holding means.

However, in the case of CISC (Complex Instruction Set Computer) whose instruction length is not fixed, the instruction length of the instruction is not judged unless the F stage for reading out the instruction is executed. Therefore, when an interrupt occurs in an instruction other than the instructions in the delay slot, there is a case where the instruction length of the instruction command is not judged if the interrupt occurs before the execution of the F stage of the instruction. In this case, in the system disclosed in Japanese Laid-open Patent Application No. Hei-5-143363, the address to be saved in the second address holding means cannot be properly calculated.

Particularly in the case of VLIW (Very Long Instruction Word) to which much attention has been paid as a system for the next-generation processing unit which performs a plurality of processing simultaneously, the instruction length is fixed, however, instruction redundancy is substantial because processes which desire to be performed at the same time are integrated into one instruction. Therefore, in general an instruction is compressed and then stored in a memory. When the instruction is compressed, however, in some cases, the instruction length of the compressed instruction is not fixed. Accordingly, in the system disclosed in Japanese Laid-open patent Application No. Hei-5-143363, there is a case where the address to be saved in the second address holding means cannot be properly calculated even when the system is applied to VLIW.

The present invention has been implemented in view of the foregoing situation, and has an object to provide an interrupt control system which can accurately perform interrupt processing even when the instruction length is not fixed, a processor using the interrupt control system, and a computer system using the interrupt control system.

In order to solve the above problem, according to the present invention, an interrupt control system which is used when plural instructions which contain a branch instruction stored in a storage device in a length-variable mode, are successively read out and processed by a pipeline type processing unit. The pipeline type processing unit executing the branch instruction which has at least one instruction in a delay slot, includes:

an address storage means for storing the addresses of instructions from an instruction being interrupted (such an instruction is hereinafter referred to as "an interrupted instruction") until an instruction to be executed following the interrupted instruction and then following the number of instructions corresponding to the number of instructions contained in the delay slot;

an address read-out means for successively reading out the addresses stored in the address storage means from the address of the interrupted instruction when a processing of the interrupt has been completed;

a first instruction executing means which branches to the address which is first read out by the address read-out means to execute the instruction; and a second instruction executing means, with respect to each of the addresses of the second and subsequent instructions read out by the address read-out means, branches, when the address is an address of an instruction indicated by the branch instruction, to the address to execute the instruction, and executes, when the address is an address of an instruction other than the instruction indicated by the branch instruction, an instruction subsequent to the instruction being executed.

Here, when the interrupt control system includes address generating means for adding, to the address of the instruction being executed, an instruction length of the instruction to generate the address of an instruction to be read out and executed next, the second instruction executing means may, with respect to the second address read out by said address read-out means, when the instruction length of the interrupted instruction is known at the time when the interrupt occurs, branch to the second address to execute the instruction even when the second address is an address of an instruction other than the instruction indicated by the branch instruction.

Further, according to the present invention, a pipeline type processor for successively reading out and executing a plurality of instructions, the plural instructions containing a branch instruction and being stored in a length-variable mode in a memory for storing the instructions, includes;

an instruction supply unit for successively reading out an instruction from the memory, and when the read-out instruction is the branch instruction, reading out an instruction at a branch target address indicated by the branch instruction after reading out a subsequent instruction contained in a delay slot of the branch instruction;

an instruction executing unit for executing the instruction read out by the instruction supply unit, when the read-out instruction is the branch instruction, and notifying the branch target address indicated by the branch instruction to the instruction supply unit; and an interrupt control unit for controlling, when an interrupt occurs, an instruction to be executed after returning from processing of the interrupt, wherein the interrupt control unit has a register for storing, when the interrupt occurs, addresses of instructions from an interrupted instruction until an instruction to be executed after the number of instructions corresponding to the number of instructions contained in the delay slot and successively reading out the addresses stored in the register from the address of the interrupted instruction after the processing of the interrupt is completed, and the instruction supply unit reads out the instruction of an address which is first read out from the register by the interrupt control unit and, with respect to each of the addresses of the second and subsequent instructions read out from the register by the interrupt control unit, branches, when the address is an address of an instruction indicated by the branch instruction, to the address to execute the instruction, and reads out, when the address is an address of an instruction other than the instruction indicated by the branch instruction, an instruction subsequent to the instruction being executed.

Further, the computer system of the present invention includes a processor, a memory for storing instructions in which plural instructions containing the branch instruction are stored in a length-variable mode, and an I/O device through which said processor is connected to an input/output device.

BRIEF DESCRIPTION OF THE DRAWINGS

FIG. 17 is a diagram showing the flow of the pipeline of the program when an interrupt occurs during execution of an R stage in the instruction P of the program shown in FIG. 4;

FIG. 20 is a diagram showing an interrupt processing program which is processed by the processor used in the third embodiment of the present invention;

FIG. 26 shows an interrupt processing program which is processed by the processor shown in FIG. 22;

DETAILED DESCRIPTION OF THE PREFERRED EMBODIMENTS

Preferred embodiments according to the present invention will be described hereinafter with reference to the accompanying drawings.

Figure 1:
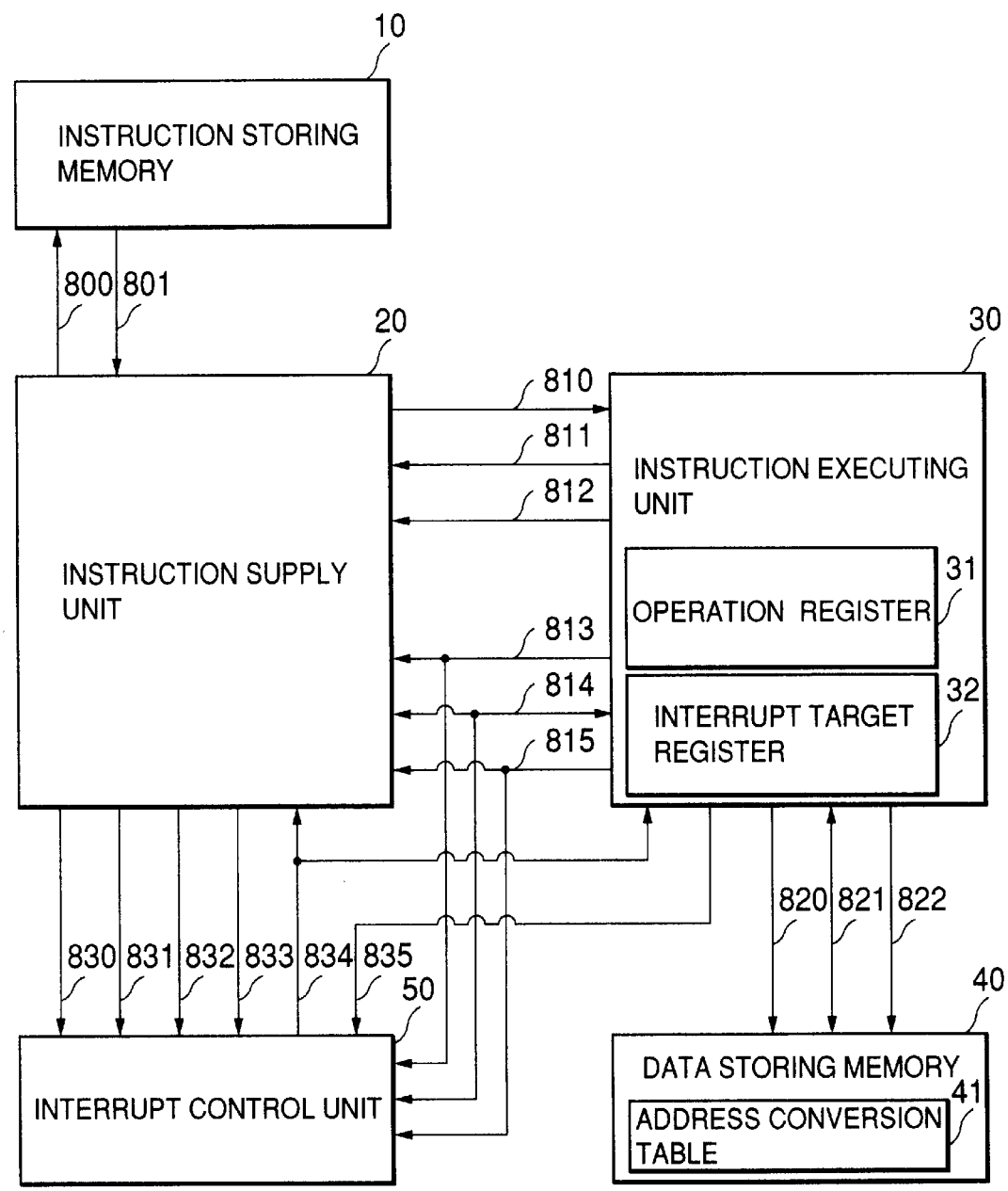
FIG. 1 is a functional diagram showing a processor using an interrupt control system according to a first embodiment of the present invention, and peripheral devices thereof.

FIG. 1 is a functional diagram showing a processor using an interrupt control system according to a first embodiment of the present invention, and peripheral devices thereof.

The processor using the interrupt control system of this embodiment is a pipeline type processor for executing a delay branch having one instruction in a delay slot when processing a program comprising a plurality of instructions containing a branch instruction.

The processor using the interrupt control system of this embodiment executes each instruction while dividing the instruction into four stages, an F stage for reading out the instruction, an R stage for decoding the read-out instruction to read out an operand, an E stage for executing the operation and a W stage for writing the operation result. The time corresponding to one clock is needed to execute each stage. Accordingly, the time corresponding to 4 clocks is needed to execute one instruction.

As shown in FIG. 1, the processor using the interrupt control system of this embodiment and the peripheral devices thereof includes a instruction storing memory 10, an instruction supply unit 20, an instruction executing unit 30, a data storing memory 40 and an interrupt control unit 50. Here, the instruction supply unit 20, the a; instruction executing unit 30 and the interrupt control unit 50 correspond to the processor. The instruction storing memory 10 and the data storing memory 40 correspond to the peripheral devices.

The instruction storing memory 10 is adapted to store a predetermined program comprising a plurality of instructions and an interrupt processing program for performing interrupt processing, etc. The instruction storing memory 10 reads out an instruction which is notified through an address line 800 and stored at a physical address, and transmits this instruction to the instruction supply unit 20 through a data line 801.

The data storing memory 40 is adapted to store an address conversion table 41 used for address conversion (conversion from a virtual address to a physical address) in the instruction supply unit 20 and data used for operational processing in the instruction executing unit 30, etc. The data storing memory 40 reads out data stored in a physical address which is transmitted through an address line 820 when a read-out instruction is notified through a control line 822, and transmits it to the instruction executing unit 30 through a data line 821. Further, when a write-in instruction is notified through the control line 822, the data storing memory 40 writes the data transmitted from the instruction executing unit 30 through the data line 821 into the physical address which is transmitted through the address line 820.

After a virtual address of an instruction to be executed is generated, the instruction supply unit 20 converts the virtual address to a physical address, and transmits the physical address to the instruction storing memory 10 via the address line 800, thereby reading out the instruction to be executed from the instruction storing memory 10. Further, the instruction supply unit 20 detects the instruction length of the instruction which is transmitted from the memory storing unit 10 by the data line 801, and performs prescribed processing as necessary, thereafter transmitting the instruction to the instruction executing unit 30 via the data line 810. These processes are performed in the F stage.

When an interrupt occurs due to trouble in the address conversion operation, the instruction supply unit 20 also notifies the occurrence of the interrupt to the interrupt control unit 50 by using an instruction supply interrupt signal line 830. In this embodiment, all the interrupts occurring in the instruction supply unit 20 are assumed to occur in the F stage.

Further, when receiving an interrupt request from the interrupt control unit 50 through the interrupt signal line 834, the instruction supply unit 20 transmits both a return virtual address after the execution of the interrupt processing program, that is, the virtual address of the interrupted instruction and the virtual address of an instruction to be executed just subsequently to the instruction, to the interrupt control unit 50 through address lines 831 and 832, respectively. The instruction supply unit 20 also transmits through a signal line 833 to the interrupt control unit 50 a signal indicating whether the virtual address which is transmitted through the signal line 832, that is, the virtual address of the instruction to be executed just subsequently to the interrupted instruction is a branch target address which is indicated by the branch instruction.

The instruction executing unit 30 decodes the instruction which is transmitted from the instruction supply unit 20 through the data line 810, and performs operational processing, branch processing, access to the data storing memory 40 and access to an internal register of the instruction supply unit 20 and the interrupt control unit 50 in accordance with the decoding result. The operational processing is performed by reading out desired data from a register 31 for operation in the R stage, performing the operation in the E stage and writing the operation resulting into a register 21 for operation in the W stage.

When the instruction transmitted from the instruction supply unit 20 is a branch instruction, branch processing is performed by transmitting the virtual address serving as the branch destination indicated by the branch instruction and the branch request, to the instruction supply unit 20 through a branch destination address line 811 and a branch request signal line 812 in the R stage.

Access to data storing memory 40 is performed by using an address line 820 for transmitting the physical address of a data storage destination, a data line 821 for transmitting data and a control signal line 822 for controlling access. Access to the internal register of the instruction supply unit 20 or the interrupt control unit 50 is performed by accessing a desired register by using an identifying signal line 813 for transmitting an identification signal for the register, a data signal line 814 for transmitting data and a control signal line 815 for controlling the access.

When the decoded instruction is an incorrect instruction, the instruction executing unit 30 notifies control unit 50 of the occurrence of an interrupt through an instruction execution interrupt signal line 835. Further, the processing of the interrupt processing program stored in the instruction storing memory 10 is started by executing the branch to the virtual address which is the branch destination and prestored in the interrupt target register 32. In this embodiment, the interrupts in the instruction executing unit 30 are assumed to occur in the R stage.

The interrupt control unit 50 receives an interrupt notification which is transmitted through the instruction execution interrupt signal line 835 or the instruction supply interrupt signal 830 to check the priority (the order of precedence) and an interrupt mask, etc., and then outputs through the interrupt signal line 834 to the instruction supply unit 20 and the instruction execution unit 30 both an interrupt request and a signal indicating the stage where the interrupt occurs.

Next, the instruction supply unit 20 shown in FIG. 1 will be described in detail.

Figure 2:
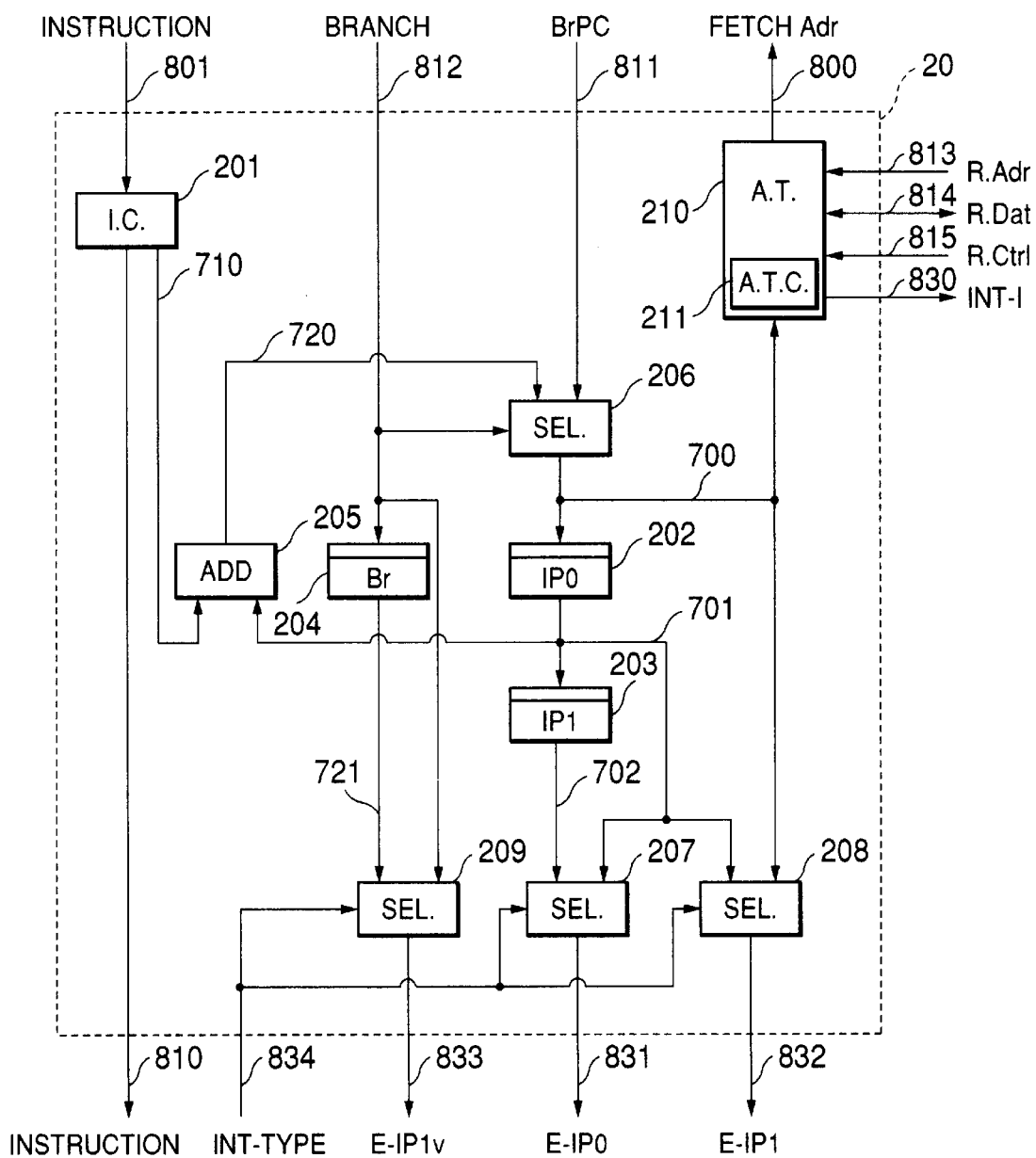
FIG. 2 is a schematic diagram showing an instruction supply unit shown in FIG. 1.

FIG. 2 is a schematic diagram showing the instruction supply unit 20 shown in FIG. 1.

As shown in FIG. 2, the instruction supply unit 20 includes an instruction conversion unit 201, registers 202 to 204, an adder 205, selectors 206 to 209 and an address conversion circuit 210.

The instruction conversion unit 201 receives an instruction transmitted through the data line 801 from the instruction storing memory 10 to perform conversion processing such as instruction expansion, etc. on the instruction, and transmits the converted instruction to the instruction executing unit 30 through the data line 810. Further, the instruction conversion unit 201 detects the instruction length of the received instruction, and transmits the detected instruction length to the adder 205 through the signal line 710.

The register 202 holds a virtual address output to the address line 700, and at the same time outputs to an address line 701, a virtual address which has been held until now, thereby holding the virtual address of an instruction whose F stage is being executed, that is, the instruction to which the read-out access is made by the instruction supply unit 20. The register 203 holds a virtual address output to the address line 701, and at the same time outputs to the address line 702, a virtual address which has been held until now, thereby holding the virtual address of the instruction whose R stage is being executed, that is, the instruction which is decoded in the instruction executing unit 30. The register 204 holds a signal on the branch request signal line 812, and at the same time it outputs to the signal line 721, a signal which has been held until now. Accordingly, the signal line 812 is supplied with the signal indicating whether the instruction just before the instruction whose F stage is being executed, that is, the instruction whose R stage is being executed, is a branch instruction, and the signal line 721 is supplied with a signal indicating whether the instruction just before the instruction whose R stage is being executed, that is, the instruction whose E stage is being executed, is a branch instruction.

The adder 205 adds the virtual address output to the address line 701, that is, the virtual address of the instruction whose F stage has been executed to the instruction length transmitted from the instruction conversion unit 201 through the signal line 710, whereby the virtual address of an instruction to be next executed when no branch occurs is calculated and output to the address line 720.

When a branch request is transmitted through the branch request signal line 812 from the instruction executing unit 30, the selector 206 selects the virtual address at the branch destination which is transmitted from the instruction executing unit 30 through the branch destination address line 811. On the other hand, when no branch request is transmitted, it selects the virtual address which is transmitted from the adder 205 through the address line 720. The selector 206 outputs the selected virtual address to the address line 700 as the virtual address of an instruction to be next executed.

The address conversion circuit 210 receives the virtual address of the instruction to be next executed which outputs onto the address line 700 by the selector 206 to convert the virtual address to the physical address, and transmits the converted physical address through the address line 800 to the instruction storing memory 10. The instruction storing memory 10 transmits the instruction stored in the physical address through the data line 801 to the instruction conversion unit 201 of the memory supply unit 20.

The address conversion from the virtual address to the physical address is performed by referring to an address conversion cache 211 which is contained in the address conversion circuit 210. The address conversion cache 211 is used to perform the address conversion at a high speed, and a copy of a part of the address conversion table 41 which is stored in the data storing memory 40 is stored in the address conversion cache 211. In the case where a value needed for address conversion does not exist in the address conversion cache 211 (in this case, the virtual address is converted to an erroneous physical address), the address conversion circuit 210 notifies interrupt control unit 50 of the occurrence of an interrupt through the instruction supply interrupt signal line 830 when the F stage of an instruction which causes the above erroneous conversion is completed.

When an interrupt occurs, the selector 207 transmits through the address line 831 to the interrupt control unit 50 the virtual address of the instruction to be first executed when the processing returns from the interrupt processing program, that is, the virtual address of the interrupted instruction. Specifically, when the occurrence of the interrupt in the F stage is notified from the interrupt control unit 50 through the interrupt signal line 834, the selector 207 selects the virtual address on the address line 701, that is, the virtual address of the instruction whose F stage is executed (the interrupted instruction), and outputs the selected virtual address to the address line 831. On the other hand, when the occurrence of the interrupt in the R stage is notified from the interrupt control unit 50 through the interrupt signal line 834, the selector 207 selects the virtual address on the address line 702, that is, the virtual address of the instruction whose R stage is executed (the interrupted instruction), and outputs the selected virtual address to the address line 831.

When an interrupt occurs, the selector 208 transmits through the address line 832 to the interrupt control unit 50 the virtual address of an instruction to be executed next to the instruction which is to be first executed when the processing returns from the interrupt processing program. Specifically, when the occurrence of the interrupt in the F stage is notified from the interrupt control unit 50 through the interrupt signal line 834, the selector 208 selects the virtual address on the address line 700, that is, the virtual address of an instruction to be executed next to the instruction whose F stage is executed (the interrupted instruction), and outputs the selected virtual address to the address line 832. On the other hand, when the occurrence of the interrupt in the R stage is notified from the interrupt control unit 50 through the interrupt signal line 834, the selector 208 selects the virtual address on the address line 701, that is, the virtual address of an instruction to be executed next to the instruction whose R stage is executed (the interrupted instruction), and outputs the selected virtual address to the address line 832.

The selector 209 outputs a signal indicating whether the virtual address selected by the selector 208 is the virtual address of the branch destination. Specifically, when the occurrence of the interrupt in the F stage is notified from the interrupt control unit 50 through the interrupt signal line 834, the selector 209 selects the signal on the branch request signal line 812, and outputs the signal to the signal line 833. On the other hand, when the occurrence of the interrupt in the R stage is notified from the interrupt control unit 50 through the interrupt signal line 834, the selector 209 selects the signal on the signal line 721, and outputs the selected signal to the signal line 833.

In the instruction supply unit 20 shown in FIG. 2, when the selector 206 selects the virtual address of the branch destination which is transmitted from the instruction executing unit 30 through the branch destination address line 811, the virtual address selected by the selector 208 is the virtual address of the branch destination. In this case, the virtual address of the branch destination is a virtual address indicated by the branch instruction, and thus it is guaranteed that the accurate virtual address value is output to the address line 832.

On the other hand, when the selector 206 selects a virtual address transmitted from the adder 205 through the address line 720, the virtual address selected by the selector 208 is a virtual address calculated by the adder 205. When an interrupt occurs because no necessary value is stored in the address conversion cache 211, an error occurs in the converted physical address, and thus an instruction different from an instruction which should be originally executed is read out from the instruction storing memory 10.

Accordingly, an instruction length different from that of the instruction which should be originally executed is detected in the instruction conversion unit 210. In such a case, an error occurs in the virtual address calculated by the adder 205, and thus an inaccurate virtual address value is output to the address line 832.

As described above, when the virtual address selected by the selector 208 is the virtual address of the branch destination, the selected virtual address is guaranteed to be an accurate value. However, when it is not the virtual address of the branch destination, there is a possibility that the selected virtual address is not an accurate value. Therefore, by using the fact that only one instruction is contained in the delay slot which is processed by the processor to which the interrupt control system of this embodiment is applied, the selector 209 outputs information indicating whether the virtual address selected by the selector 208 is the virtual address of the branch destination or not, on the basis of a judgment as to whether an instruction just before the interrupted instruction is a branch instruction.

When an interrupt occurs because no necessary value is stored in the address conversion cache 211, the instruction executing unit 30 branches to the virtual address of the branch destination which is prestored in the interrupt target register 32, thereby performing the interrupt processing program stored in the instruction storing memory 10. The instruction executing unit 30 reads out a desired part from the address conversion table 41 to renew the content of the address conversion cache 211 by using the address signal line 813, the data signal line 814 and the control signal line 815.

Next, the interrupt control unit 50 shown in FIG. 1 will be described in detail.

Figure 3:
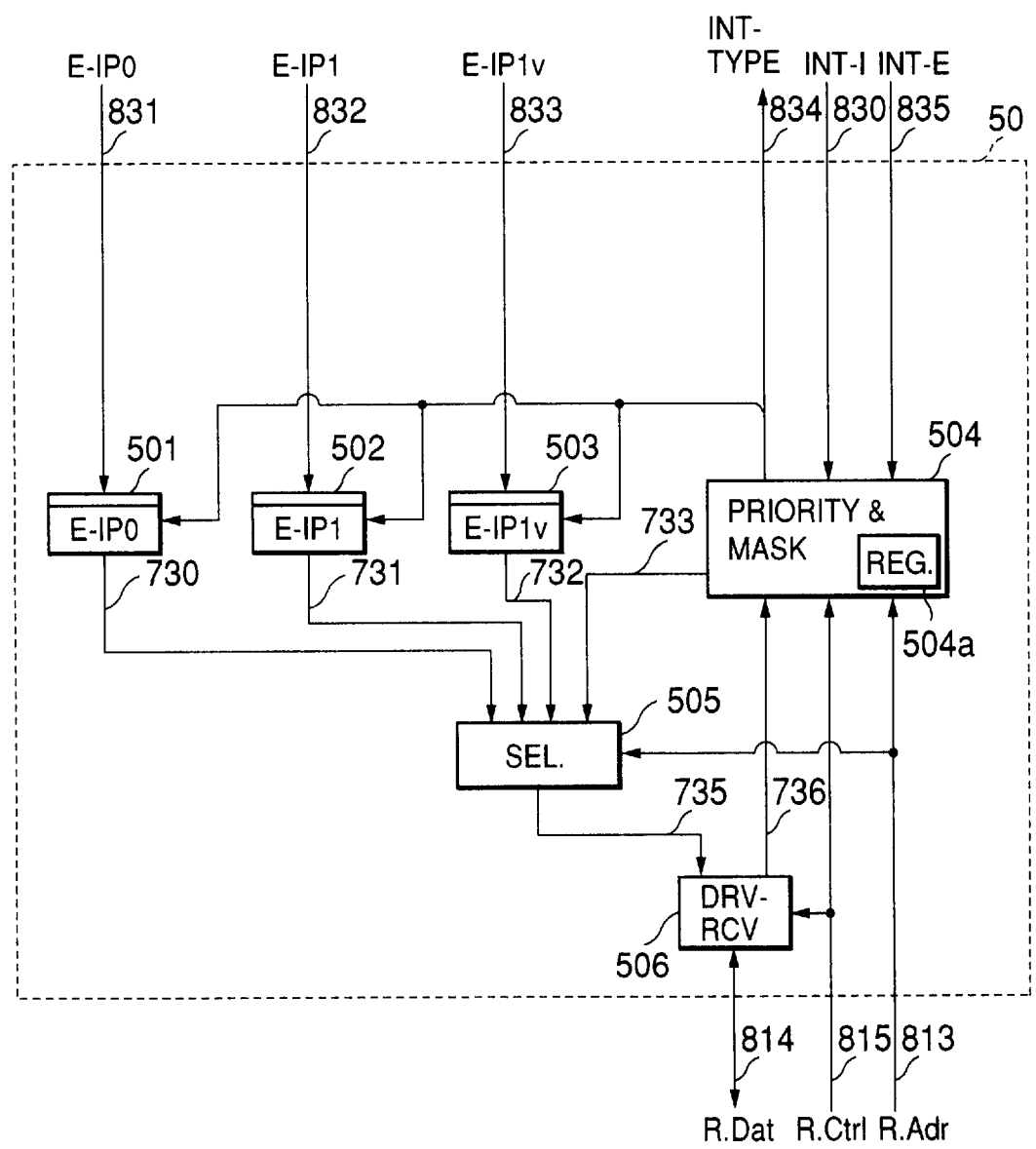
FIG. 3 is a schematic diagram showing an interrupt control unit shown in FIG. 1.

FIG. 3 is a schematic diagram showing the interrupt control unit 50 shown in FIG. 1.

As shown in FIG. 3, the interrupt control unit 50 comprises registers 501 to 503, an interrupt adjustment circuit 504, a selector 505 and a bidirectional driver 506.

The interrupt adjustment circuit 504 determines an interrupt to be processed on the basis of priorities or masks an interrupt not to be processed when a plurality of interrupts occur at the same time. As described above, according to this embodiment, there are assumed two types of interrupts, one interrupt which occurs in the instruction supply unit 20 (the interrupt occurring in the F stage) and the other interrupt which occurs in the instruction executing unit 30 (the interrupt occurring in the R stage). The interrupt occurring in instruction supply unit 20 is caused where no needed value is stored in the address conversion cache 121 or the like. In this case, when the execution of the instruction causing the interrupt goes to the F stage, the occurrence of the interrupt is notified from the instruction supply unit 20, through the instruction supply interrupt signal line 830, to the interrupt control unit 50. On the other hand, the interrupt occurring in the instruction executing unit 30 is caused in such a case where the decoded instruction is an incorrect instruction or the like. In this case, when the execution of the instruction causing the interrupt goes to the R stage, the occurrence of the interrupt is notified from the instruction executing unit 30 through the instruction execution interrupt signal line 835 to the interrupt control unit 50.

On the basis of the data stored in the register 504a, the interrupt adjustment circuit 504 judges the priority (the order of precedence) or the presence or absence of a mask on the interrupt which is notified through the instruction supply interrupt signal line 830 and/or the instruction execution interrupt signal line 835, and notifies the interrupt to be processed to the instruction supply unit 20, the instruction executing unit 30 and the registers 501 to 503 through the interrupt signal line 834.

The interrupt adjustment circuit 504 transmits the data stored in the register 504a (the data indicating the priority or the presence or absence of a mask) to the selector 505 through the signal line 733 when the control signal transmitted from the instruction executing unit 30 through the control signal line 815 indicates a read-out access and the identification signal transmitted through the address line 813 indicates the register 504a.

Further, the interrupt adjustment circuit 504 stores the data on the data line 814 into the register 504a when the control signal transmitted through the control signal line 815 from the instruction executing unit 30 indicates a write-in access. In this embodiment, the writing operation from the instruction executing unit 30 into the registers 501 to 502 is prohibited. Accordingly, when the register 504a comprises plural registers, the address signal line 813 is used only to select one of the plural registers in a writing mode.

With the output of an interrupt request from the interrupt adjusting circuit 504 to the interrupt signal line 834 as a trigger, the register 501 stores the virtual address transmitted from the selector 207 of the instruction supply unit 20 through the address line 831, that is, the virtual address of an instruction to be first executed when the processing returns from the interrupt processing program. With the output of an interrupt request from the interrupt adjusting circuit 504 to the interrupt signal line 834 as a trigger, the register 502 stores the virtual address transmitted from the selector 208 of the instruction supply unit 20 through the address line 832, that is, the virtual address of an instruction to be executed next to the instruction which is to be first executed when the processing returns from the interrupt processing program. Further, with the output of an interrupt request from the interrupt adjustment circuit 504 to the interrupt signal line 834 as a trigger, the register 503 stores the information transmitted from the selector 209 of the instruction supply unit 20 through the signal line 833, that is, the information indicating whether the virtual address stored in the register 502 is the virtual address of the branch destination.

The selector 505 selects a register indicated by the identification signal transmitted through the address line 813 from the instruction executing unit 30 from the values stored in the registers 501 to 503 and the value stored in the register 504a of the interrupt adjusting circuit 504, and outputs the value stored in the selected register onto the signal line 735.

The bi-directional driver 506 determines the data transmission direction on the basis of the control signal transmitted from the instruction executing unit 30 through the control signal line 815. When the control signal indicates the read-out access, the value transmitted from the selector 505 through the address line 735 is transmitted through the data line 814 to the instruction executing unit 30. On the other hand, when the control signal indicates the write-in access, the data transmitted from the instruction supply unit 20 through the data line 814 is transmitted through the data line 736 to the interrupt adjustment circuit 310.

Next, the operation of the processor and the peripheral devices shown in FIG. 1 will be described with respect to the drawings.

First, the operation when no interrupt occurs will be described.

Figures 4, 5:
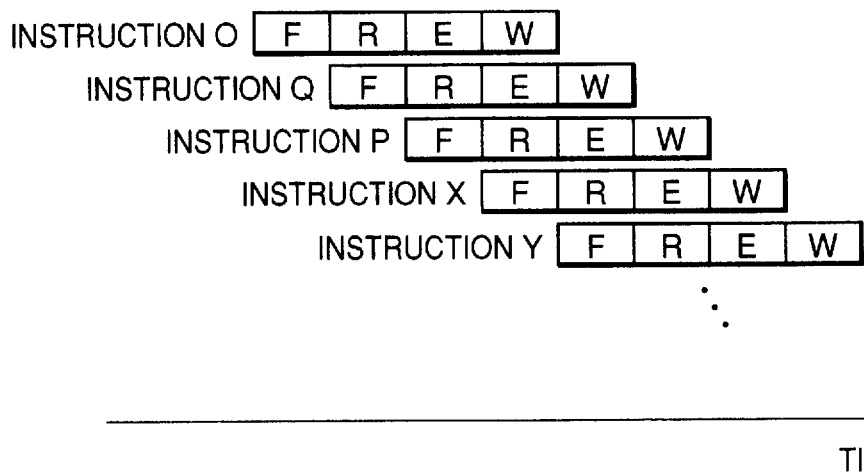
FIG. 4 is a diagram showing a program containing a branch instruction having a delay slot which is processed by the processor shown in FIG. 1.
FIG. 5 is a diagram showing the flow of a pipeline when the processor shown in FIG. 1 executes the program shown in FIG. 4.

FIG. 4 shows a program containing a branch instruction having a delay slot, which is processed by the processor shown in FIG. 1. Here, LD represents data transmission between the registers, and JMP represents a command indicating a branch. Each instruction constituting the program is assumed to have an unfixed instruction length in a state where it is stored in the instruction storing memory 10.

FIG. 5 shows the flow of a pipeline when the processor shown in FIG. 1 executes the program shown in FIG. 4.

In the processor shown in FIG. 1, the instruction supply unit 20 converts the virtual address of an instruction to be read out to a physical address, and reads out the instruction stored in the physical address from the instruction storing memory 10. Thereafter, it subjects the conversion processing such as expansion processing or the like on the read-out instruction, and transmits the processed instruction to the instruction executing unit 30 and also generates the virtual address of an instruction to be read out next to the read-out instruction. The memory supply unit 20 repeatedly performs the series of operations described above (F stage) in the time corresponding to one clock.

Further, the instruction executing unit 30 decodes the instruction transmitted from the instruction supply unit 20 to read out an operand (R stage), performs the operation (E stage), and writes the operation result (W stage). This operation is performed in the time corresponding to one clock stage by stage every time the instruction is transmitted from the instruction supply unit 20. Accordingly, in the processor shown in FIG. 1, three instructions at maximum can be executed in parallel as shown in FIG. 5, whereby the processing speed of the program can be enhanced.

Further, when the instruction transmitted from the instruction supply unit 20 is a branch instruction, the instruction executing unit 30 transmits the virtual address and branch request of the branch destination indicated by the branch instruction to the instruction supply unit 20 by using the branch destination address line 811 and the branch request signal line 812 after the R stage is completed. Accordingly, the virtual address of the branch destination is transmitted to the instruction supply unit 20 after the time corresponding to 2 clocks elapses from the start of the execution of the branch instruction. Therefore, as shown in FIG. 5, the execution of the branch destination routine L1 (instruction X, instruction Y) of the instruction Q is started after the execution of the instruction Q serving as the branch instruction is started and then the execution of the instruction P which is a subsequent instruction of the branch instruction is started. That is, the delay branch having the delay slot containing one instruction is executed.

Next, the operation when an interrupt occurs will be described separately in both cases where an interrupt occurs in an instruction other than the instruction in the delay slot and where an interrupt occurs in the instruction in the delay slot.

Figures 6, 7:
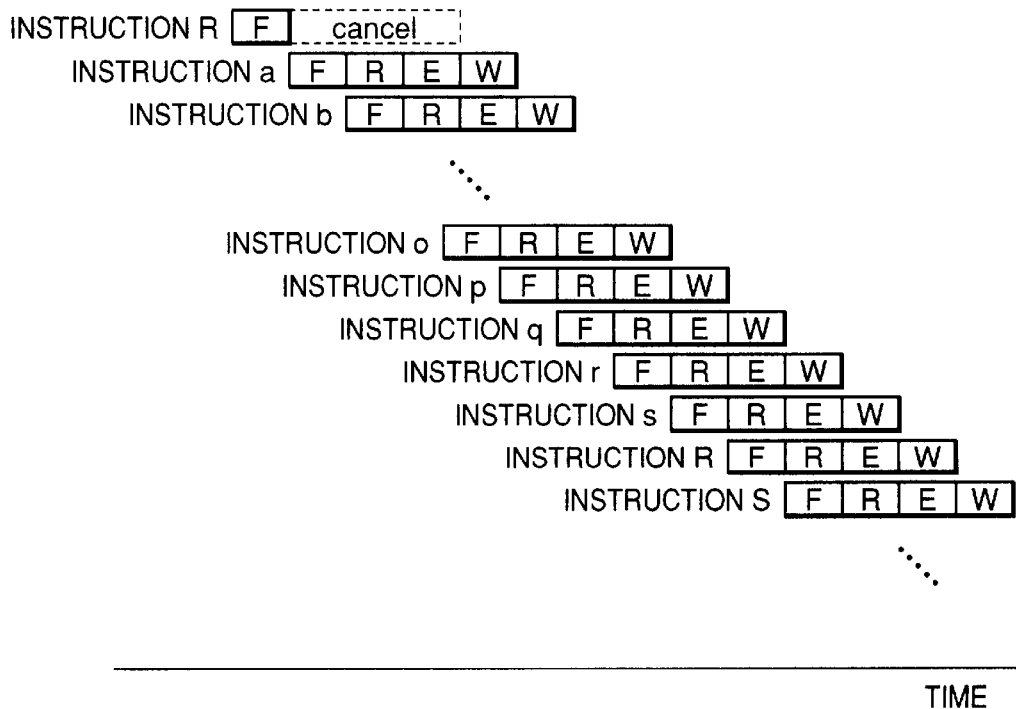
FIG. 6 is a diagram showing an interrupt processing program which is processed in the processor shown in FIG. 1.
FIG. 7 is a diagram showing the flow of the pipeline of the program when an interrupt occurs during execution of an F stage in an instruction R of the program shown in FIG. 4.

FIG. 6 shows an example of the interrupt processing program which is processed by the processor shown in FIG. 1. Here, D1 represents a command indicating the prohibition of an interrupt, EI represents a command indicating the release of an interrupt, CMP represents a command indicating the comparison between two data, JNE represents the branch under conditions, and NOP (Non-operation) represents a command indicating that no operation is carried out.

A case where an interrupt occurs in an instruction other than the instruction in the delay slot will be described.

First, a case where an interrupt occurs in the F stage of the instruction will be described with reference to FIG. 7.

FIG. 7 shows the flow of the pipeline of the program when an interrupt occurs under execution of the F stage in the instruction R of the program shown in FIG. 4.

When the interrupt occurs in the F stage of the instruction R, that is, when the interrupt occurs in the instruction R in the middle of the processing of the instruction R in the instruction supply unit 20, the instruction supply unit 20 notifies the occurrence of the interrupt to the interrupt control unit 50 by using the instruction supply interrupt signal line 830 at the same time when the execution of the F stage of the instruction R is completed.

The interrupt control unit 50 judges the priority (the order of precedence) and the presence or absence of a mask of the interrupt notified thereto etc., and notifies the judgment result to the instruction executing unit 30 through the interrupt signal line 834 if the interrupt is judged to be processed.

Upon receiving the notification on the occurrence of the interrupt from the interrupt control unit 50, the instruction executing unit 30 finishes the processing without executing the instruction R transmitted from the instruction supply unit 20 through the data line 810, and, as shown in FIG. 7, the execution of the R stage and the subsequent stages thereto of the instruction R is canceled. Further, the instruction executing unit 30 transmits through the branch destination address line 811 to the instruction supply unit 20 the virtual address of the branch destination which is prestored in the interrupt target register 32.

The instruction supply unit 20 converts the virtual address of the branch destination transmitted from the instruction executing unit 30 to the physical address to read out the instruction stored in the physical address of the instruction storing memory 10, whereby the branch to the instruction at the head address of the interrupt processing program is performed, and the interrupt processing program shown in FIG. 6 is executed.

In the interrupt processing program shown in FIG. 6, an interrupt prohibition is instructed to prevent another interrupt from occurring in the course of the processing of an interrupt (instruction a). Upon receiving the instruction, the instruction executing unit 30 rewrites the register 504a contained in the interrupt adjustment circuit 504 of the interrupt control unit 50 into "presence of mask". When the content of the register 504a corresponds to the presence of mask, the interrupt control unit 50 does not notify the interrupt request through the interrupt signal line 834 to other units even when an interrupt is subsequently notified through the instruction supply interrupt signal line 830 and/or the instruction execution interrupt signal line 835.

Subsequently, it is instructed that the virtual address stored in the register 501 (E-IP0) of the interrupt control unit 50 (the virtual address of the interrupted instruction, that is, the virtual address of the instruction R) is stored into a register 1A which is provided in the register 31 for operation of the instruction executing unit 30 (instruction b). Upon receiving this instruction, the instruction executing unit 30 accesses the register 501 through the identification signal line 813 and the control signal line 815. The interrupt control unit 50 transmits the virtual address stored in the register 501 through the address line 813 to the instruction executing unit 30. The instruction executing unit 30 stores the virtual address transmitted from the interrupt control unit 50 into a register IA of the register 31 for operation.

Subsequently, it is instructed that the virtual address stored in the register 502 (E-IP1) of the interrupt control unit 50 (the virtual address of the instruction to be executed next to the interrupted instruction, that is, the virtual address of the instruction S) is stored into a register IB which is provided in the operation register 31 of the instruction execution unit 30 (instruction c). Upon receiving this instruction, the instruction executing unit 30 accesses the register 502 through the identification signal line 813 and the control signal line 815, and the interrupt control unit 50 transmits the virtual address stored in the register 502 to the instruction executing unit 30 through the address line 813. The instruction executing unit 30 stores the virtual address transmitted from the interrupt control unit 50 into the register IB of the operation register 31.

Subsequently, it is instructed that the value stored in a register 503 (E-IP1V) of the interrupt control unit 50 (the value indicating whether the virtual address stored in the register IB by execution of the instruction c is the virtual address of the branch destination) is stored in the register IC provided in the operation register 31 of the instruction executing unit 30 (instruction d). Upon receiving this instruction, the instruction executing unit 30 accesses the register 503 through the identification signal line 813 and the control signal line 815, and the interrupt control unit 50 transmits the value stored in the register 503 through the address line 813 to the instruction executing unit 30. The instruction executing unit 30 stores the value transmitted from the interrupt control unit 50 into the register IC of the operation register 31.

In this embodiment, the signal stored in the register 503 is set to "1" when the virtual address stored in the register 502 is the virtual address of the branch destination. On the other hand, when the virtual address stored in the register 502 is not the virtual address of the branch destination, the signal stored in the register 503 is set to "0".

Each of the instructions from the instruction e to the instruction just before the instruction o is used to perform predetermined interrupt processing. These instructions are varied in accordance with interrupt inducing factors. These instructions are prepared basically on the basis of the same idea as the normal interrupt processing program. Therefore, the description of these instructions is omitted.

In the instruction o, it is instructed to compare the content of the register IC with 0 (instruction o). Upon receiving this instruction, the instruction executing unit 30 compares "0" and the value stored in the register IC of the operation register 31, that is, the value indicating whether the virtual address stored in the register IB is the virtual address of the branch destination. Thereafter, if the comparison of the instruction o indicates that the values are coincident with each other, it is instructed to branch to a routine L2 (instruction p). In this case, it is assumed that the interrupt occurs in the instruction R shown in FIG. 4, and thus the virtual address of the instruction S to be executed next to the interrupted instruction R is not the virtual address indicated by the branch instruction. Accordingly, the value stored in the register IC is equal to 0. Therefore, the instruction executing unit 30 does not execute the branch processing to the routine L2, but executes the subsequent instruction q as shown in FIG. 7.

In the instruction q, it is instructed to release the interrupt prohibition which is instructed by the instruction a. Upon receiving this instruction, the instruction executing unit 30 rewrites the register 504a of the interrupt adjustment circuit 504 of the interrupt control unit 50 to "no mask". However, the rewriting of the register 504a is set to be validated after the two instructions of the instruction q.

Subsequently, the branch to the instruction of the virtual address stored in the register IA is instructed (instruction r). Upon receiving this instruction, the instruction executing unit 30 executes the execution of the virtual address stored in the register IA, that is, the interrupted instruction R. However, in this embodiment, since the delay branch having the delay slot containing one instruction is executed as described above, the execution of the instruction R is performed after the execution of the instruction s subsequent to the instruction r as shown in FIG. 7. Since the instruction s contains an instruction which is called a Non-operation (NOP) and instructs that no operation is to be carried out, the program shown in FIG. 4 can be accurately processed without changing the execution order after the processing returns from the interrupt processing as shown in FIG. 7.

When the interrupt occurs in the F stage of the instruction R, the instruction length of the instruction R is not known accurately at this stage, and thus the virtual address of the instruction S which is the subsequent instruction to the instruction R cannot be obtained accurately even when the instruction length of the instruction R is added to the virtual address of the instruction R. Therefore, in this embodiment, when the instruction (in this case, the instruction S) to be executed next to the instruction to be first executed (in this case, the instruction R) is not the branch destination of the branch instruction after the processing returns from the interrupt processing, the branch to the virtual address which is stored in the register 501 by the instruction r is executed, and then the NOP instruction is executed without branching to the virtual address stored in the register 502 by the instruction s contained in the delay slot of the instruction r, thereby preventing the execution order of the program from being changed after the processing returns from the interrupt processing.

Next, a case where an interrupt occurs in the R stage will be described with reference to FIG. 8.

Figure 8:
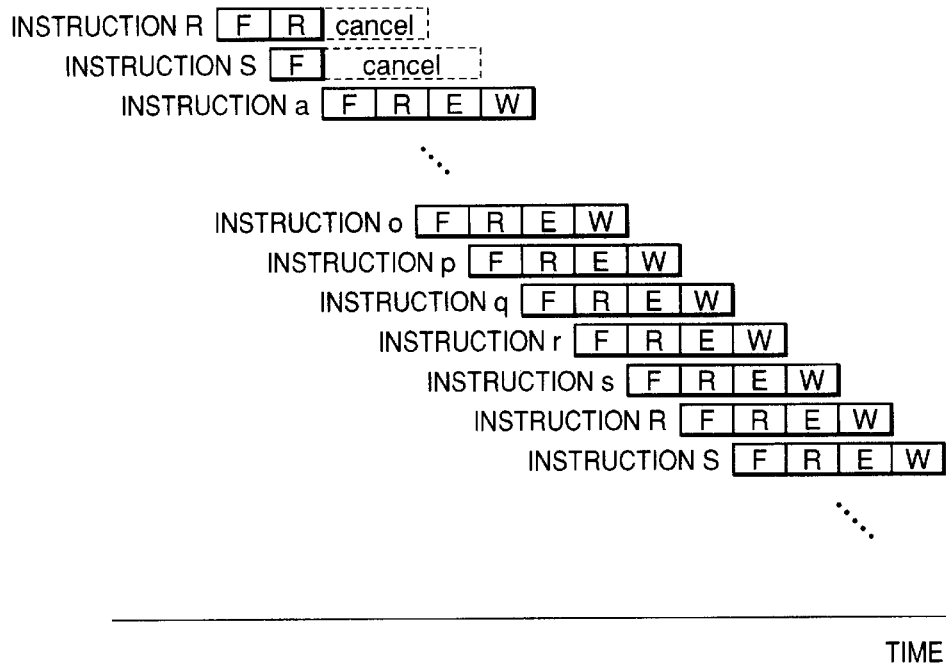
FIG. 8 is a diagram showing the flow of the pipeline of the program when an interrupt occurs during execution of an R stage in the instruction R of the program shown in FIG. 4.

FIG. 8 shows the flow of the pipeline of the program when the interrupt occurs in the course of the execution of the R stage in the instruction R of the program shown in FIG. 4.

When the interrupt occurs in the R stage of the instruction R, that is, when the interrupt occurs in the instruction R in the middle of the processing of the instruction R in the instruction executing unit 30, the instruction executing unit 30 notifies the occurrence of the interrupt through the instruction execution interrupt signal line 835 to the interrupt control unit 50 simultaneously with the completion of the R stage of the instruction R.

The interrupt control unit 50 judges the order of precedence and the presence or absence of a mask, etc., of the notified interrupt, and if the interrupt is to be processed, the interrupt control unit 50 gives notification to the instruction executing unit 30 through the interrupt signal line 834.

Upon receiving the notification indicating the occurrence of the interrupt from the interrupt control unit 50, the instruction execution unit 30 ceases the execution of the instruction R, and also ceases the execution of the instruction S transmitted from the instruction supply unit 20 through the data line 830 to cancel the E and subsequent stages of the instruction R and the R and subsequent stages of the instruction S as shown in FIG. 8. Further, the virtual address of the branch destination which is prestored in the built-in interrupt target register 32 is transmitted to the instruction supply unit 20.

The instruction supply unit 20 converts the virtual address of the branch destination transmitted from the instruction executing unit 30 to the physical address, and reads out an instruction stored in the physical address of the instruction storing memory 10. Therefore, the branch to the instruction at the head address of the interrupt processing program is performed, and the interrupt processing program shown in FIG. 6 is performed in the same manner as the case where the interrupt occurs in the F stage of the instruction R. Accordingly, as shown in FIG. 8, the program shown in FIG. 4 can be accurately processed without altering the execution order after the processing returns from the interrupt process.

When the interrupt occurs in the R stage of the instruction R, the processing (F stage) of the instruction R in the instruction supply unit 20 has been already completed, so that the instruction conversion unit 201 of the instruction supply unit 20 transmits the accurate instruction length of the instruction R to the adder 205 of the instruction supply unit 20. Therefore, the virtual address of the instruction S calculated by the adder 205 is an accurate value, and thus the accurate virtual address of the instruction S is stored in the register 502 of the interrupt control unit 50. Accordingly, by executing the instruction which indicates the virtual address stored in the register 502 as the branch destination, the instruction S is allowed to be performed. However, in this case, in order to simplify the processing, the interrupt processing program shown in FIG. 6 is executed in the same manner as the case where the interrupt occurs in the F stage of the instruction R.

Next, the case where the interrupt occurs in the instruction in the delay slot will be described using a case where the interrupt occurs in the F stage and a case where the interrupt occurs in the R stage.

First, the case where the interrupt occurs in the F stage will be described with reference to FIG. 9.

Figure 9:
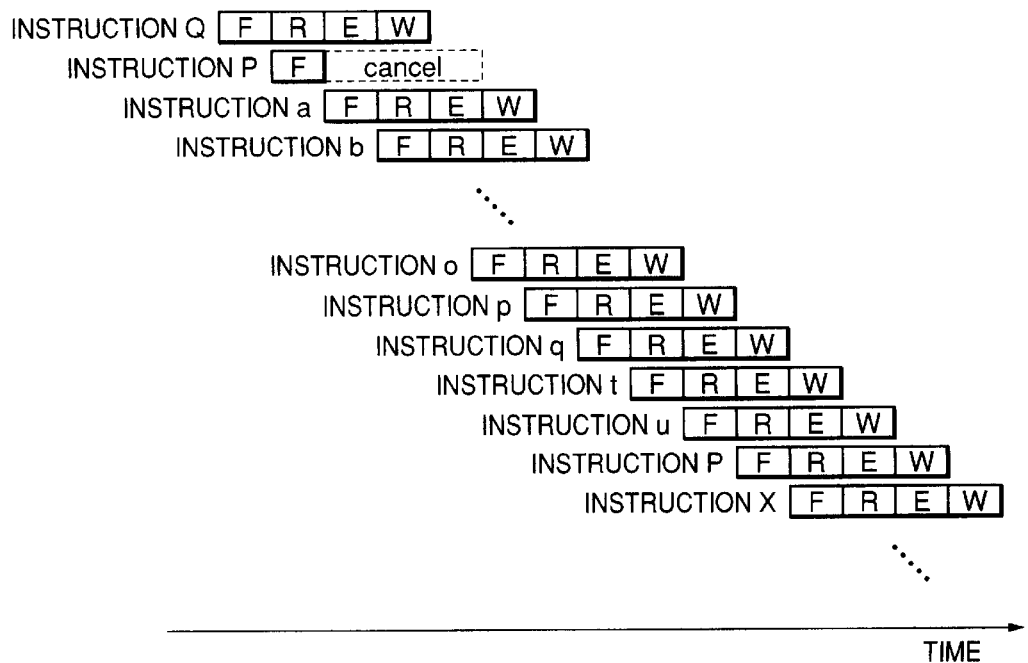
FIG. 9 is a diagram showing the flow of the pipeline of the program when an interrupt occurs during execution of an F stage in an instruction P of the program shown in FIG. 4.

FIG. 9 shows the flow of the pipeline of the program when the interrupt occurs during the execution of the F stage in the instruction P of the program shown in FIG. 4.

When the interrupt occurs in the F stage of the instruction P contained in the delay slot of the instruction Q which is the branch instruction, that is, when the interrupt occurs in the instruction P in the middle of the processing of the instruction P in the instruction supply unit 20, the instruction supply unit 20 notifies the occurrence of the interrupt to the interrupt control unit 50 through the instruction supply interrupt signal line 830 at the same time as when the execution of the F stage of the instruction P is completed.

The interrupt control unit 50 judges the order of precedence and the presence or absence of the mask of the notified interrupt, and if the interrupt is judged to be processed, the interrupt control unit 50 gives notification to the instruction execution unit 30 through the interrupt signal line 834.

Upon being informed of the interrupt by the interrupt control unit 50, the instruction execution unit 30 finishes the processing without executing the instruction transmitted from the instruction supply unit 20 through the data line 830, and cancels the R and subsequent stages of the instruction P as shown in FIG. 9. Further, the virtual address of the branch destination which is prestored in the built-in interrupt target register 32 is transmitted to the instruction supply unit 20.

The instruction supply unit 20 converts the virtual address of the branch destination transmitted from the instruction execution unit 30 to the physical address, and reads out the instruction stored in the physical address of the instruction storing memory 10. Accordingly, the branch to the instruction at the head address of the interrupt processing program is performed, and the interrupt processing program shown in FIG. 6 is executed.

When the interrupt occurs in the instruction P contained in the delay slot, after the processing returns from the interrupt processing, the instruction X to be executed next to the instruction P to be first executed is the instruction of the branch destination whose virtual address is indicated by the branch instruction Q. Therefore, the signal stored in the register 503 of the interrupt control unit 50 is equal to "1". Accordingly, the value stored in the register IC of the operation register 312 of the instruction executing unit 30 is set to "1" by the instruction d shown in FIG. 6, and thus the branch to the routine L2 is executed by the instruction p. However, in this embodiment, the delay branch having the delay slot containing one instruction is executed as described above, and thus the instruction t is executed after the instruction q is executed.

In the instruction t, it is instructed to branch to the instruction of the virtual address stored in the register IA. Upon receiving this instruction, the instruction executing unit 30 executes the instruction of the virtual address stored in the register IA, that is, the interrupted instruction P. However, according to this embodiment, since the delay branch having the delay slot containing one instruction is executed as described above, the execution of the instruction P is performed after the subsequent instruction u of the instruction t is executed as shown in FIG. 9.

In the instruction u, it is instructed to branch to the instruction of the virtual address stored in the register IB. Upon receiving this instruction, the instruction executing unit 30 executes the instruction of the virtual address stored in the register IB, that is, the instruction X of the branch destination whose virtual address is indicated by the branch instruction Q. However, according to this embodiment, since the delay branch having the delay slot containing one instruction is executed as described above, the execution of the instruction X is performed after the execution of the instruction subsequent to the instruction u, that is, the instruction P of the branch destination indicated by the instruction t as shown in FIG. 9. Thus, according to this embodiment, as shown in FIG. 9, the program shown in FIG. 4 can be accurately processed without altering the execution order after the processing returns from the interrupt processing as shown in FIG. 9.

When an interrupt occurs in the instruction P, the instruction to be executed next to the instruction P is the instruction X of the branch destination whose virtual address is indicated by the branch instruction Q. Accordingly, at the stage that the interrupt occurs, the accurate virtual address of the instruction X is known. Therefore, in this embodiment, when the instruction (in this case, the instruction X) to be executed next to the instruction (in this case, the instruction P) to be first executed after the processing returns from the interrupt processing is the branch destination of the branch instruction (in this case, the instruction Q), the branch to the virtual address stored in the register 501 is executed by the instruction t, and then the branch to the virtual address stored in the register 502 is executed by the instruction u contained in the delay slot of the instruction t, thereby preventing the execution order of the program from being altered after the processing returns from the interrupt processing.

Next, the case where the interrupt occurs in the R stage will be described with reference to FIG. 10.

Figure 10:
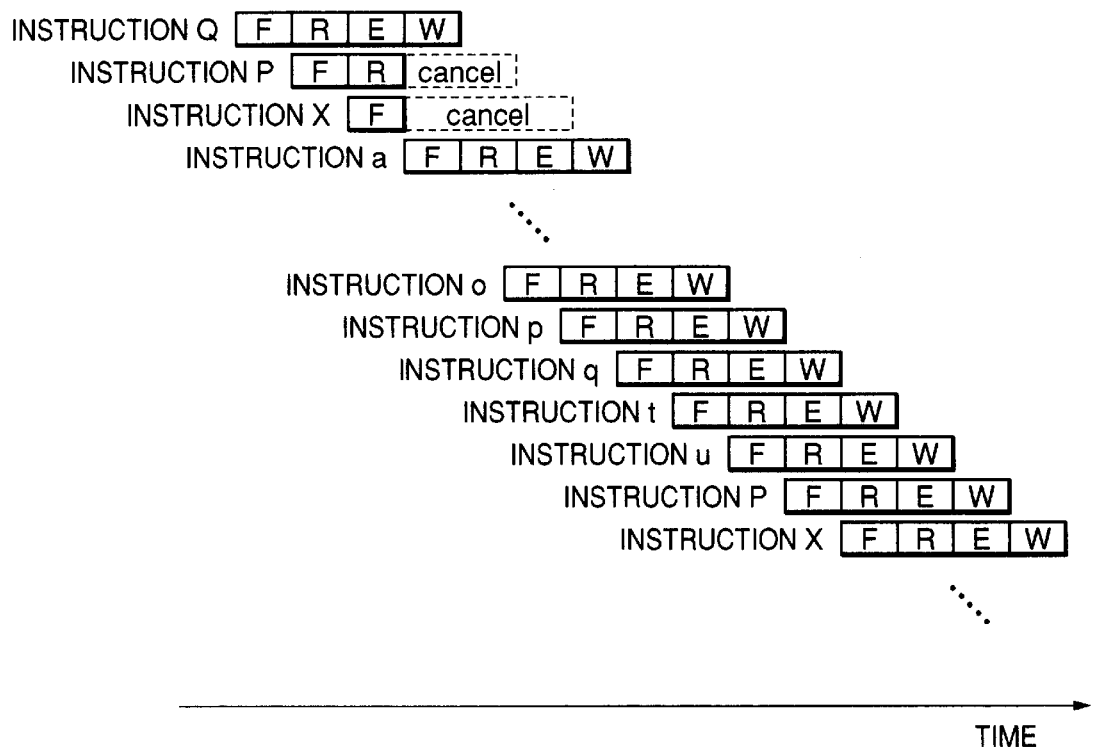
FIG. 10 is a diagram showing the flow of the pipeline of the program when an interrupt occurs during execution of an R stage in the instruction P of the program shown in FIG. 4.

FIG. 10 shows the flow of the pipeline of the program when the interrupt occurs during the execution of the R stage in the instruction P of the program shown in FIG. 4.

When the interrupt occurs in the R stage of the instruction P, that is, when the interrupt occurs in the instruction P in the middle of the processing of the instruction P in the instruction executing unit 30, the instruction executing unit 30 notifies the occurrence of the interrupt to the interrupt control unit 50 through the instruction execution interrupt signal line 835 at the same time as when the R stage of the instruction P is completed.

The interrupt control unit 50 judges the order of precedence, the presence or absence of the mask, etc. of the notified interrupt, and if the interrupt is to be processed, the interrupt control unit 50 gives notification to the instruction execution unit 30 through the interrupt signal line 834.

Upon receiving the notification of the occurrence of the interrupt from the interrupt control unit 50, the instruction execution unit 30 ceases the execution of the instruction P, and also ceases the execution of the instruction X transmitted from the instruction supply unit 20 through the data line 830 to cancel the E and subsequent stages of the instruction P and the R and subsequent stages of the instruction X. Further, the virtual address of the branch destination which is prestored in the built-in interrupt target register 32 is transmitted to the instruction supply unit 20.

The instruction supply unit 20 converts the virtual address of the branch destination transmitted from the instruction executing unit 30 to the physical address, and reads out the instruction stored in the physical address of the instruction storing memory 10, whereby the branch to the instruction at the head address of the interrupt processing program is performed, and the interrupt processing program shown in FIG. 6 is executed in the same manner as the case where the interrupt occurs in the F stage of the instruction P as described above. Accordingly, as shown in FIG. 10, after the processing returns from the interrupt processing, the program shown in FIG. 4 can be accurately processed without altering the execution order.

In this embodiment, when the instruction to be executed soon after the instruction to be first executed after the processing returns from the interrupt processing is the branch destination of the branch instruction, the branch to the virtual address stored in the register 501 is executed by the instruction t and then the branch to the virtual address stored in the register 502 is performed by the instruction u contained in the delay slot of the instruction t. On the other hand, when the instruction is not the branch destination of the branch instruction, the NOP instruction is executed by the instruction s contained in the delay slot of the instruction r after the branch to the virtual address stored in the register 501 is performed without executing the branch to the virtual address stored in the register 502. With this operation, even when the instruction length of each instruction of the program stored in the instruction storing memory is not fixed, the program can be accurately processed in a predetermined order irrespective of whether the interrupted instruction is in the delay slot or not.

Next, a second embodiment according to the present invention will be described with reference to the drawings.

Figure 11:
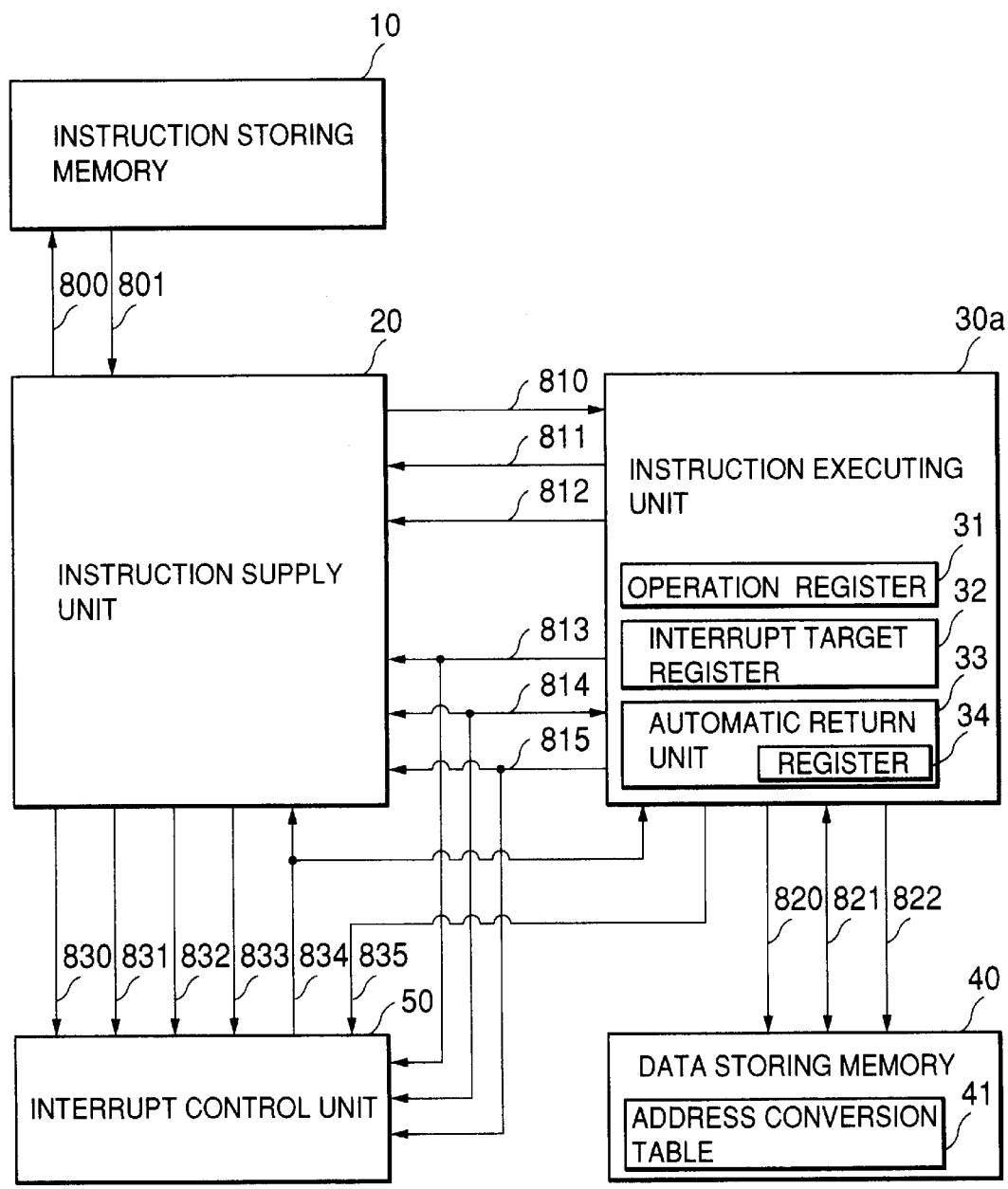
FIG. 11 is a functional diagram showing a processor using an interrupt control system according to a second embodiment, and peripheral devices thereof.
Figure 12:
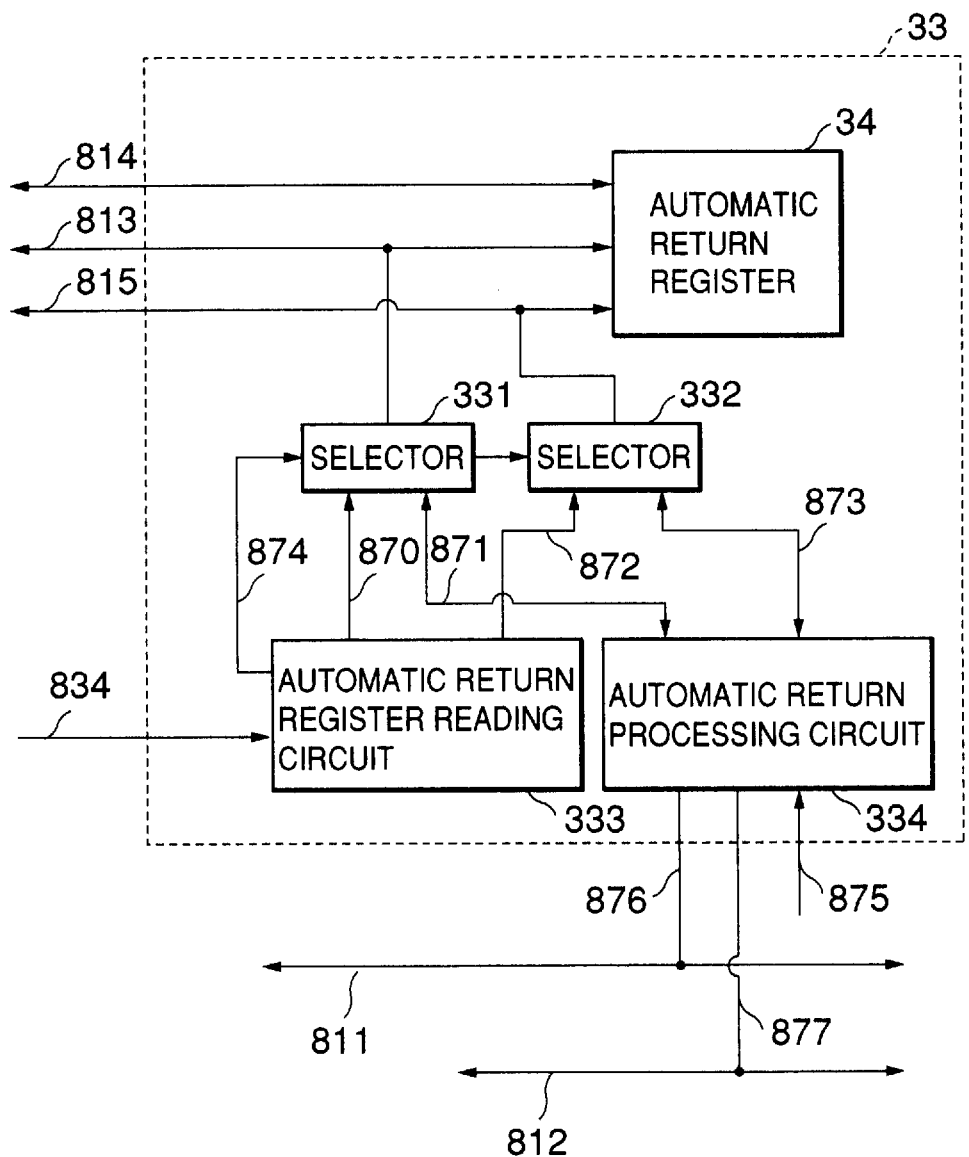
FIG. 12 is a schematic diagram showing an automatic return unit shown in FIG. 11.

FIG. 11 is a functional diagram showing a processor using an interrupt control system according to a second embodiment of the present invention, and peripheral devices thereof, and FIG. 12 is a schematic diagram showing an automatic return unit shown in FIG. 11.

The difference between this embodiment and the first embodiment is that when the processing returns from the interrupt processing, the processing of executing the program in a predetermined order (the processing corresponding to the instructions b to d, the instruction o, the instruction p, and the instruction r to u of the interrupt processing program shown in FIG. 6) is not performed in a software fashion, but in a hardware fashion by an automatic return unit 33. In the process and the peripheral devices show in FIG. 11, the elements having the same functions as the first embodiment and are represented by the same or corresponding reference numerals, and a detailed description thereof is omitted.

As shown in FIG. 12, the automatic return unit 33 comprises an automatic return register 34, selectors 331, 332, an automatic return register read-in circuit 333, and an automatic return processing circuit 334.

Upon receiving the interrupt request from the interrupt control unit 50 through the interrupt signal line 834, the automatic return register read-in circuit 333 controls the selectors 331 and 332 connect the identification signal line 870 and the control signal line 872 to the signal lines 813 and 815, respectively. Further, it successively accesses the registers 501 to 503 of the interrupt control unit 50, and theores the values stored in the registers 501 to 503 into the automatic return register 34. Normally, the selectors 331 and 332 are controlled to connect the identification signal line 813 and the control signal line 815 to the signal lines 871 and 873, respectively.

When receiving a start signal to the signal line 875, the automatic return processing circuit 334 accesses the automatic return register 34 to read out the value transmitted from the register 503. If the value is equal to "0", the value transmitted from the register 502 is not the virtual address of the instruction of the branch destination which is indicated by the branch instruction. In this case, the automatic return processing circuit 334 reads out only the value transmitted from the register 501 of the automatic return register 34 (the virtual address of the interrupted instruction), outputs it through a signal line 876 onto the branch destination address line 811, and transmits it to the instruction supply unit 20. Further, it outputs a branch request through a signal line 877 onto the branch request signal line 812, and transmits it to the instruction supply unit 20. On the other hand, if the value is equal to "1", the value transmitted from the register 502 is the virtual address of the instruction of the branch destination which is indicated by the branch instruction. In this case, the automatic return processing circuit 334 successively reads out from the automatic return register 34 the value transmitted from the register 501 (the virtual address of the interrupted instruction) and the value transmitted from the register 502 (the virtual address of the instruction of the branch destination), outputs the values onto the branch destination address line 811 through the signal line 876, and transmits the values to the instruction supply unit 20. Further, the branch request is output onto the branch request signal line 812 through the signal line 877, and transmitted to the interrupt supply unit 20.

Next, the operation when the interrupt occurs in the processor and the peripheral devices thereof shown in FIG. 11 will be described using a case where the interrupt occurs in an instruction other than the instruction in the delay slot and a case where the interrupt occurs in the instruction in the delay slot. The operation when no interrupt occurs is the same as the first embodiment, and thus the detailed description thereof is omitted.

Figures 13, 14:
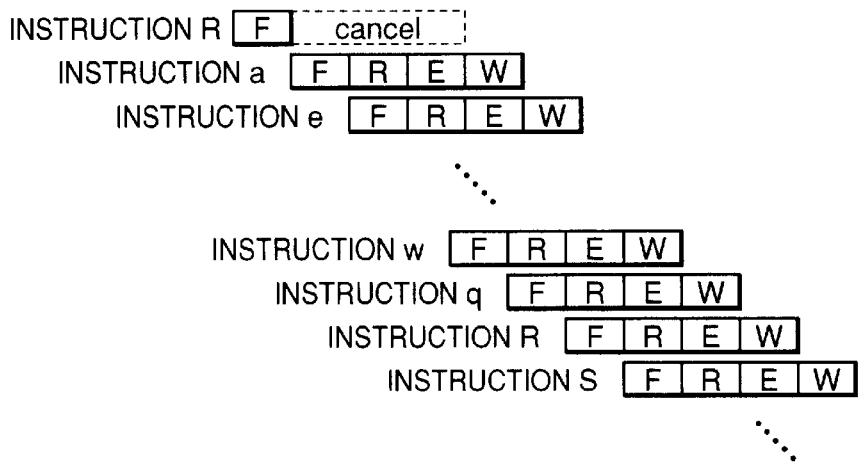
FIG. 13 shows an interrupt processing program which is processed by the processor shown in FIG. 11.
FIG. 14 is a diagram showing the flow of the pipeline of the program when an interrupt occurs during execution of an F stage in an instruction R of the program shown in FIG. 4.

FIG. 13 shows an example of the interrupt processing program which is processed by the processor shown in FIG. 11. In FIG. 13, IRET represents a command for starting the automatic return unit 33.

First, the case where the interrupt occurs in an instruction other than the instruction in the delay slot will be described.

Figure 15:
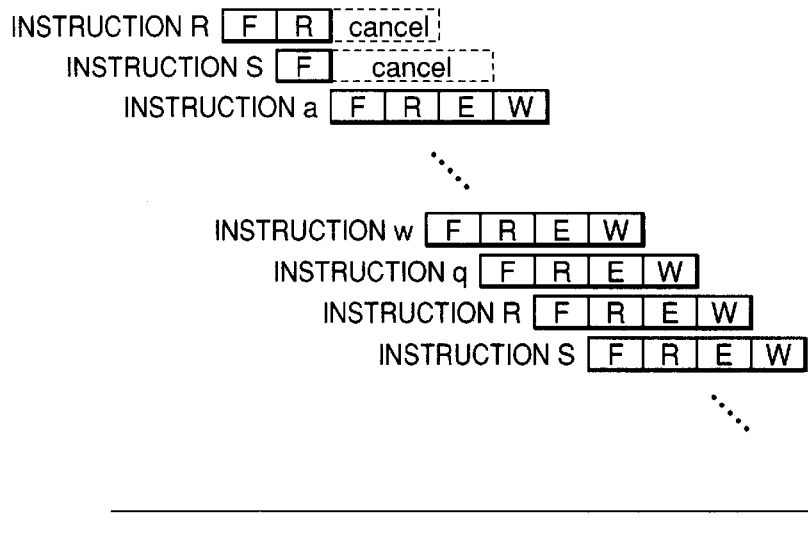
FIG. 15 is a diagram showing the flow of the pipeline of the program when an interrupt occurs during execution of an R stage in the instruction R of the program shown in FIG. 4.

FIG. 14 shows the flow of the pipeline of the program when the interrupt occurs during the execution of the F stage in the instruction R of the program shown in FIG. 4, and FIG. 15 shows the flow of the pipeline of the program when the interrupt occurs during the execution of the R stage in the instruction R of the program shown in FIG. 4.

In this embodiment, upon receiving the notification on the occurrence of the interrupt from the interrupt control unit 50, the automatic return unit 33 successively accesses the registers 501 to 503 of the interrupt control unit 50 through the identification signal line 813, the data signal line 814 and the control signal line 815, and stores the values stored in the registers 501 to 503 into the automatic return register 34. That is, the processing of the instructions b to d shown in FIG. 6 is performed automatically. Further, the interrupt processing program shown in FIG. 13 is executed by the instruction supply unit 20 and the instruction executing unit 30a.

In the interrupt processing program shown in FIG. 13, the instruction a is first executed to prohibit the interrupt. Subsequently, predetermined interrupt processing is performed in the instruction e and subsequent instructions, and then the instruction w is executed, whereby the instruction executing unit 30a outputs a start signal through the signal line 875 to the automatic return unit 33. Upon receiving the start signal, the automatic return unit 33 refers to a value which is transmitted from the register 503 of the interrupt control unit 50 to the automatic return register 34, thereby performing the branch. In this case, since the value transmitted from the register 503 of the interrupt control unit 50 to the automatic return register 34 is equal to "0", the branch in which the virtual address transmitted from the register 502 of the interrupt control unit to the automatic return register 34 is set as the branch destination is not performed, and there is performed only the branch to the virtual address transmitted from the register 501 of the interrupt control unit 50 to the automatic return register 34 (the virtual address of the instruction R). The instruction w has a delay slot containing an interrupt prohibition release instruction q. Therefore, the instruction R is performed after the execution of the instruction q.

Next, the case where the interrupt occurs in the instruction in the delay slot will be described.

Figure 16:
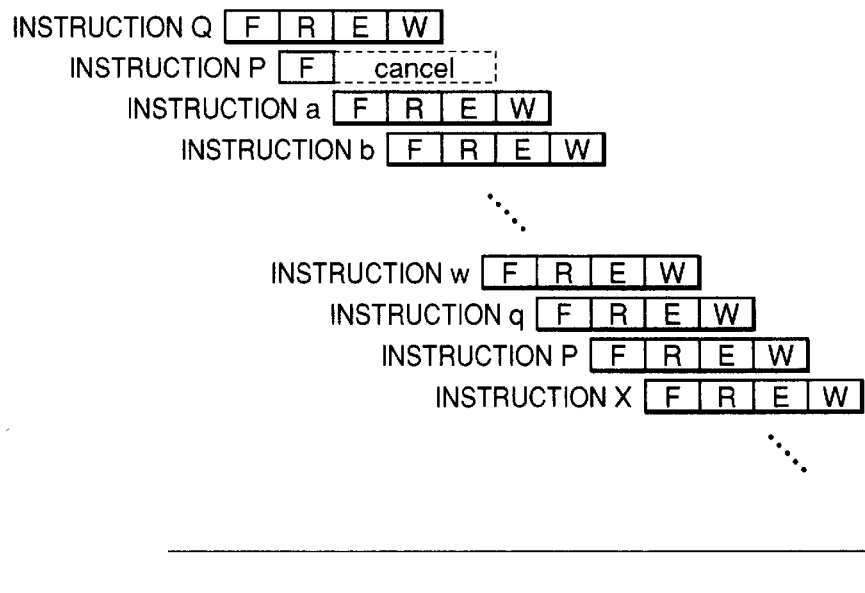
FIG. 16 is a diagram showing the flow of the pipeline of the program when an interrupt occurs during execution of an F stage in an instruction P of the program shown in FIG. 4.

FIG. 16 shows the flow of the pipeline of the program when the interrupt occurs during the execution of the F stage in the instruction P of the program shown in FIG. 4, and FIG. 17 shows the flow of the pipeline of the program when the interrupt occurs during the execution of the R stage in the instruction P of the program shown in FIG. 4.

Even when the interrupt occurs in the instruction in the delay slot, the automatic return unit 33 successively accesses the registers 501 to 503 of the interrupt control unit 50 through the identification signal line 813, the data signal line 814 and the control signal line 815, and stores the values stored in the registers 501 to 503 into the automatic return register 34, as in the case where the interrupt occurs in an instruction other than the instruction in the delay slot. Further, the interrupt processing program shown in FIG. 13 is executed by the instruction supply unit 20 and the instruction executing unit 30a.

Even when the interrupt occurs in the instruction P contained in the delay slot, the instruction X to be executed next to the instruction P to be first executed after the processing returns from the interrupt processing, is the instruction of the branch destination whose virtual address is indicated by the branch instruction Q. Therefore, the value which is transmitted from the register 503 of the interrupt control unit 50 to the automatic return register 34 is equal to "1". Accordingly, upon receiving the instruction w, the automatic return unit 33 successively executes the branch to the virtual address transmitted from the register 501 of the interrupt control unit 50 to the automatic return register 34 (the virtual address of the instruction P) and the branch to the virtual address transmitted from the register 502 of the interrupt control unit to the automatic return register 34 (the virtual address of the instruction X).

In this embodiment, when the processing returns from the interrupt processing, the processing (the processing corresponding to the instructions b to d, the instruction o, the instruction p and the instructions r to u of the interrupt processing program shown in FIG. 6) for accurately executing the program in a predetermined order is automatically performed by using the automatic return unit 33. With this operation, the processing time of the interrupt processing program can be shortened, and the interrupt processing program can be reduced.

Next, a third embodiment according to the present invention will be described with the drawings.

Figure 18:
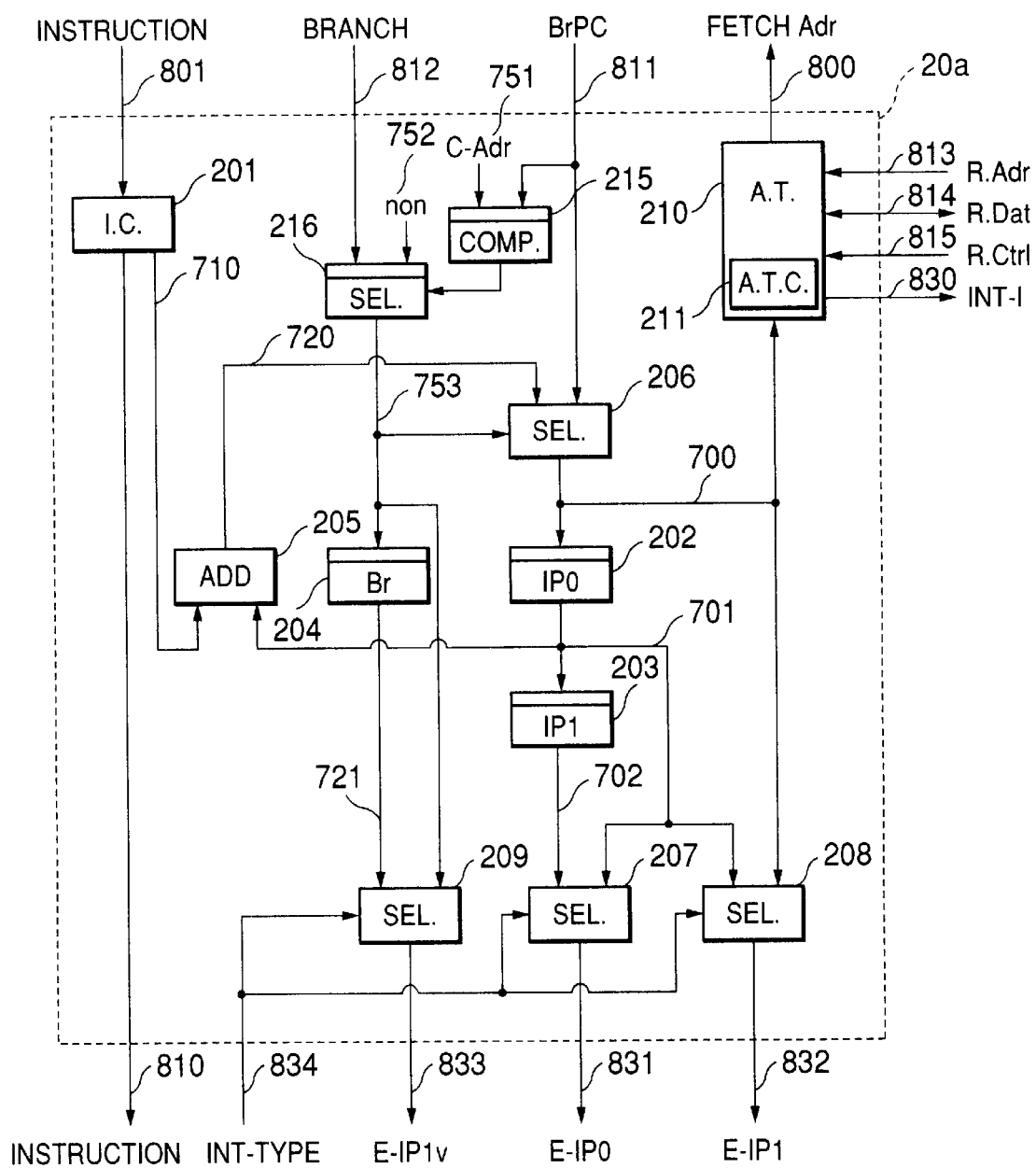
FIG. 18 is a schematic diagram showing an instruction supply unit used in a third embodiment of the present invention.
Figure 19:
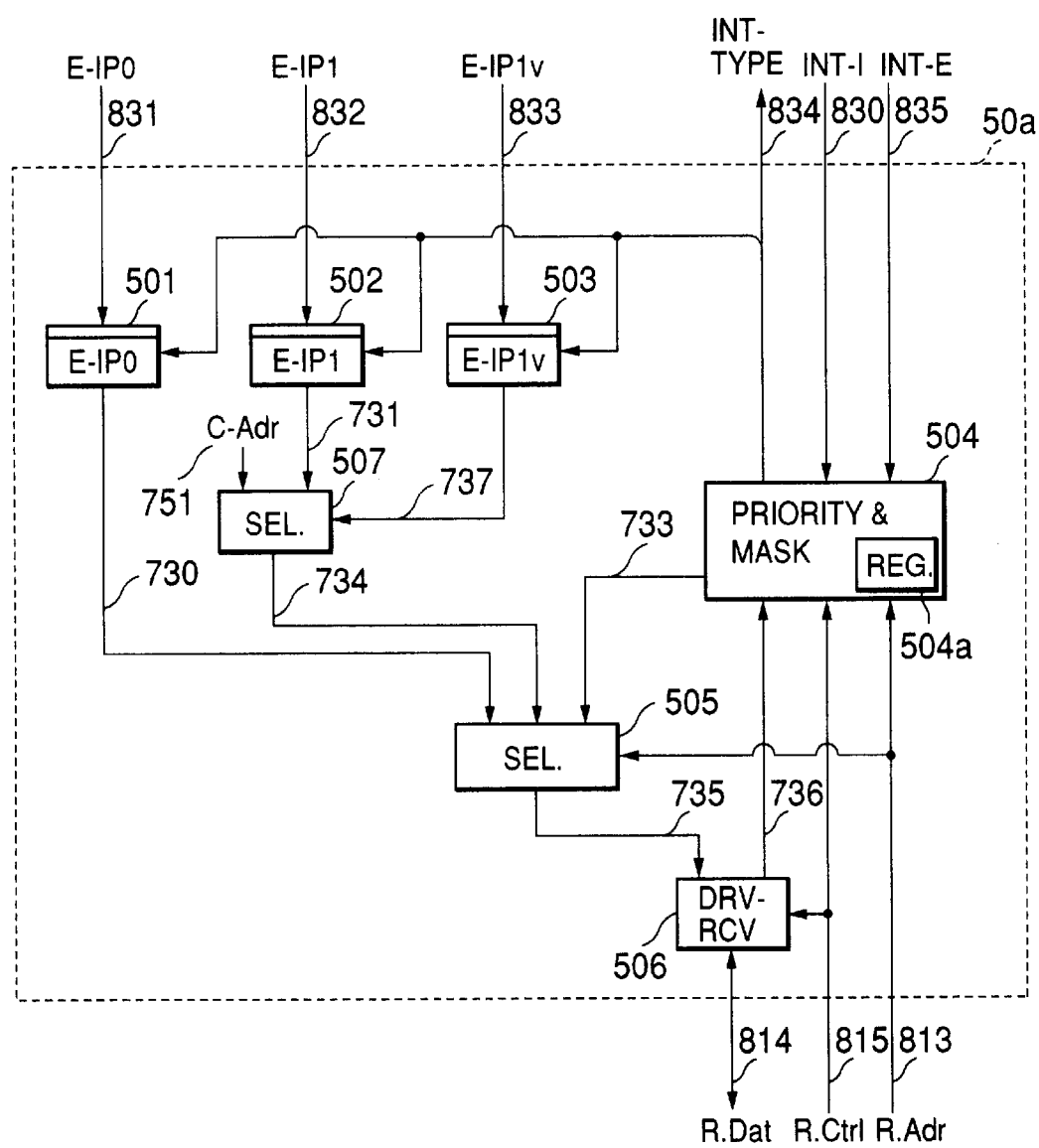
FIG. 19 is a schematic diagram showing an interrupt control unit used in the third embodiment of the present invention.

FIG. 18 is a schematic diagram showing the construction of an instruction supply unit used in the third embodiment according to the present invention, and FIG. 19 is a schematic diagram showing the construction of an interrupt control unit used in the third embodiment of the present invention. The processor and the peripheral devices thereof to which this embodiment is applied are basically the same as the first embodiment except for the instruction supply unit and the interrupt control unit. Therefore, in the following description, the functional diagram showing the processor and the peripheral devices used in this embodiment are omitted. Further, the elements having the same functions as those of the first embodiment are represented by the same or corresponding reference numerals, and the detailed description thereof are omitted.

The instruction supply unit 20a used in this embodiment is different from the instruction supply unit 20 used in the first embodiment shown in FIG. 2 in that a comparator 215 and a selector 216 are provided as shown in FIG. 18.

The comparator 215 compares the virtual address of the branch destination transmitted through the branch destination address line 811 with a predetermined virtual address. The predetermined virtual address is not necessarily required to be a single value, and it may be set within a prescribed range. The comparator 215 outputs a signal when the virtual address of the branch destination transmitted through the branch destination address line 811 is coincident with the predetermined virtual address.

When the signal is output from the comparator 215, in place of the branch request transmitted through the branch request signal line 812, the selector 216 selects a signal 752 indicating that the branch is not performed, and outputs the selected signal to the signal line 753.

In the instruction supply unit 20a used in this embodiment, if the virtual address of the branch destination transmitted through the branch destination address line 811 is coincides with the predetermined virtual address, the branch to the virtual address is not executed.

The interrupt control unit 50a used in this embodiment is different from the interrupt control unit 50 used in the first embodiment shown in FIG. 3 in that a selector 507 is provided as shown in FIG. 19.

When the signal 752, which is selected by the selector 216 of the instruction supply unit 20a and indicates that no branch is performed, is stored in the register 503, in place of the virtual address stored in the register 502 the selector 507 selects a virtual address which is impossible to be the branch destination, and transmits the virtual address to the selector 505. Accordingly, when the signal 752 indicating that the branch is not performed is stored in the register 503, the instruction executing unit 30 accesses to the register 502 through the identification signal line 813, the data signal line

814 and the control signal line 815 to read out the virtual address 751 which is impossible to be the branch destination, not the virtual address stored in the register 502.

FIG. 20 shows an example of the interrupt processing program which is processed by the processor used in this embodiment. In this program, the interrupt is prohibited by the instruction a, and then the virtual addresses stored in the registers 501, 502 of the interrupt control unit 50a are transmitted to the registers IA and IB of the operation register 31 of the instruction executing unit 30 respectively in the instructions b and c. After the predetermined interrupt processing is executed, the interrupt inhibit has released by the instruction q, and then the branch to the virtual address transmitted to the register IA and the branch to the virtual address transmitted to the register IB are executed by the instructions t and u, respectively.

As described above, according to this embodiment, when the signal 752 indicating that no branch is executed is stored in the register 503 of the interrupt control unit 50a, the instruction executing unit 30 accesses the register 502 of the interrupt control unit 50a to read out the virtual address which cannot be the branch destination. Accordingly, in this embodiment, the judgment as to whether the instruction to be executed next to the instruction to be first executed after the processing returns from the interrupt processing is the instruction for which the virtual address of the branch destination is indicated by the branch instruction, that is, the processing corresponding to the instructions d, o, p, r and s of the interrupt processing program shown in FIG. 6 used in the first embodiment, is not required to be performed in a software style by the instruction executing unit 30.

The present invention is not limited to the above-described embodiments, and various modifications may be made without departing from the scope of the subject matter of the present invention.

For example, in each embodiment, the interrupt is assumed to occur in any one of the F and R stages in order to simplify the description. However, this limitation is actually unnecessary. As an example, FIG. 21 shows an instruction supply unit which can support the case where the interrupt occurs in the E stage.

Figure 21:
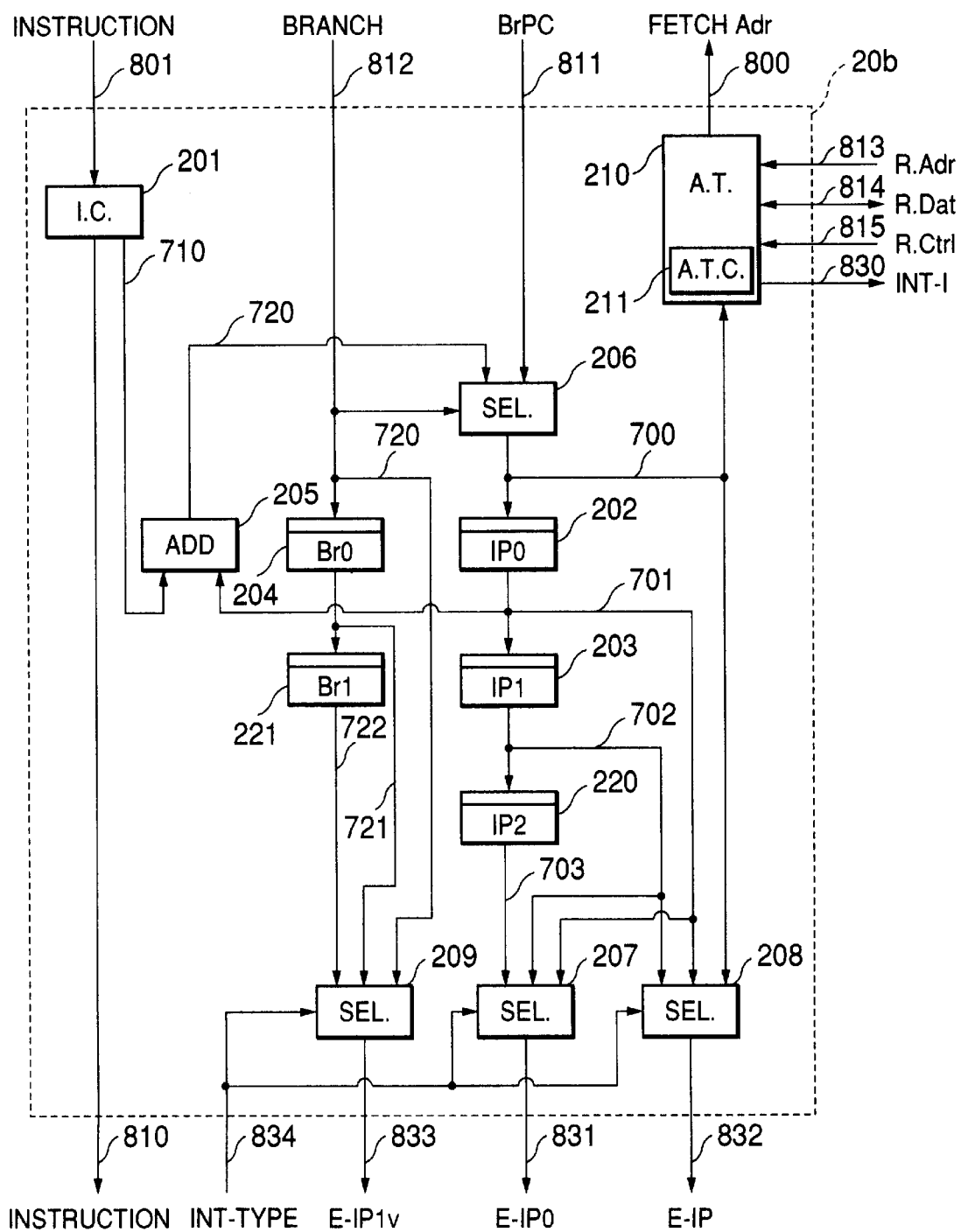
FIG. 21 is a diagram showing a modification of the instruction supply unit used in the first embodiment of the present invention.

FIG. 21 shows a modification of the instruction supply unit used in the first embodiment.

The difference of the instruction supply unit 20b shown in FIG. 21 from the instruction supply unit 20 of the first embodiment shown in FIG. 2 is that a register 220 and a register 221 are provided.

The register 220 holds the virtual address output to the address line 702, and at the same time it outputs to the address line 703 the virtual address which has been held until now. As described above, the register 203 holds the virtual address of the instruction whose R stage is being executed, that is, the instruction which is decoded by the instruction executing unit 30, and thus the register 220 holds the virtual address of the instruction whose E stage is being executed, that is, the instruction which is subjected to the operational processing in the instruction executing unit 30.

The register 221 holds the signal output to the signal line 721, and at the same time it outputs to the signal line 722 the signal which has been held until now. As described above, the register 204 holds the signal indicating that an instruction executed just before the instruction whose R stage is being executed, that is, the instruction whose E stage is being executed is the branch instruction, and thus the register 221 holds the signal indicating that an instruction executed just before the instruction whose E stage is being executed, that is, the instruction whose W stage is being executed, is the branch instruction.

The instruction supply unit 20b thus constructed operates the selectors 207 to 209 on the basis of the interrupt request notified from the interrupt control unit 50 through the interrupt signal line 834.

When it is notified from the interrupt control unit 50 that the interrupt occurs in the F stage, the selectors 207, 208 and 209 select the value on the signal line 701, the value on the signal line 700 and the value on the signal line 720, respectively.

When it is notified from the interrupt control unit 50 that the interrupt occurs in the R stage, the selectors 207, 208 and 209 select the value on the signal line 702, the value on the signal line 701 and the value on the signal line 721, respectively.

Further, when it is notified from the interrupt control unit 50 that the interrupt occurs in the E stage, the selectors 207, 208 and 209 select the value on the signal line 703, the value on the signal line 702 and the value on the signal line 722, respectively.

Accordingly, according to the instruction supply unit 20b thus constructed, even when the interrupt occurs in any one of the F to E stages, the virtual address of the interrupted instruction can be output onto the address line 831, and the virtual address of the instruction to be executed next to the interrupted instruction can be output onto the address line 832. Further, the signal indicating that the virtual address of the instruction to be executed next to the interrupted instruction is the virtual address of the branch destination which is indicated by the branch instruction can be also output.

Further, in each of the above-described embodiments, in order to simplify the description, only one instruction is assumed to be contained in the delay slot. However, actually, this limitation is unnecessary. As an example, the processor and the peripheral devices which can support the case where two instructions are contained in the delay slot will be described.

Figure 22:
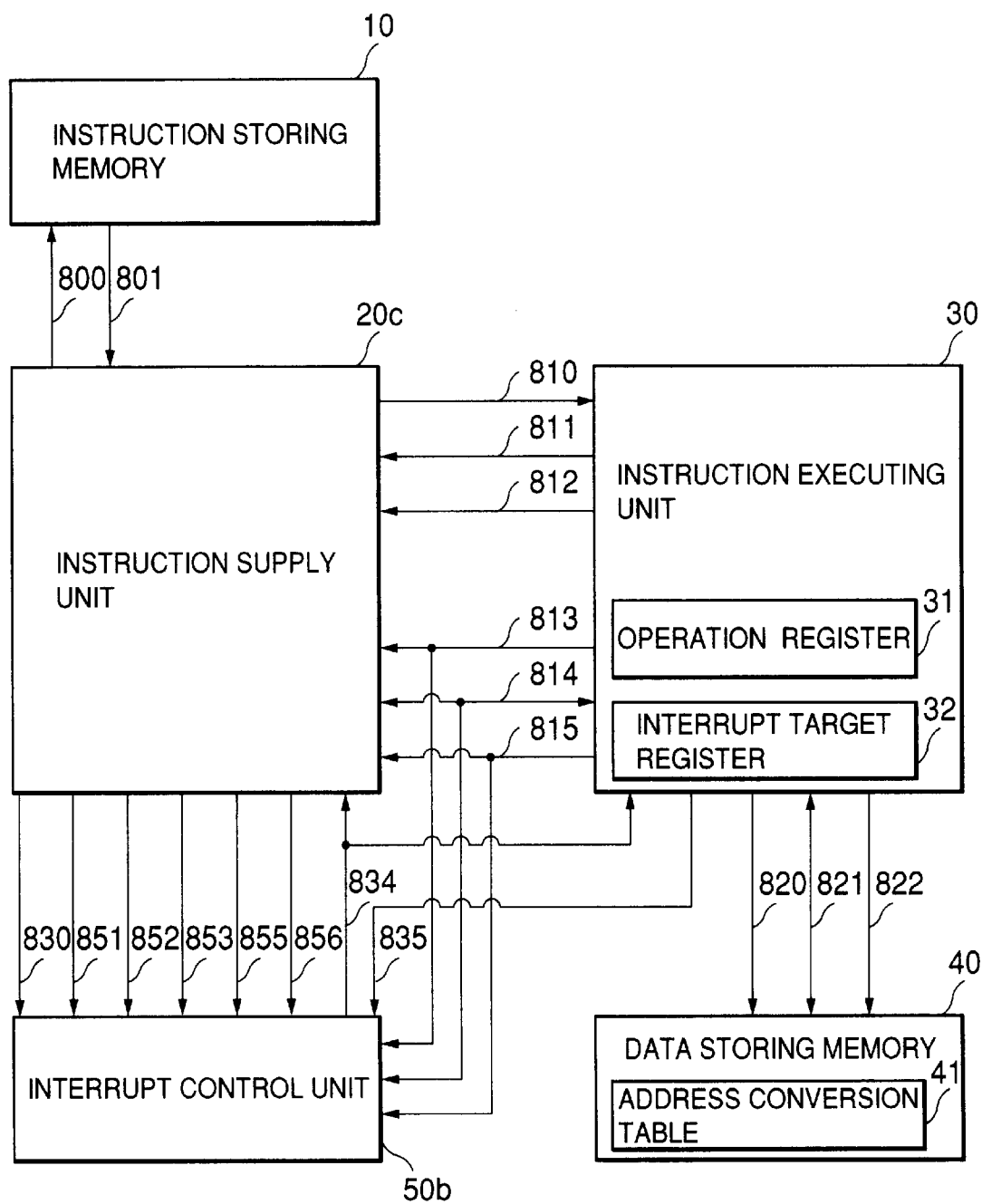
FIG. 22 is a functional diagram showing a pipeline type processor for executing a delay branch having two instructions in a delay slot, and peripheral devices thereof.

FIG. 22 is a functional diagram showing a pipeline type processor for executing a delay branch containing two instructions in a delay slot, and peripheral devices thereof.

This processor executes each instruction to be executed while dividing the instruction into five stages, an F0 stage for the first half of the instruction reading operation, an F1 stage for the last half of the instruction reading operation, an R stage for decoding the read-out instruction to read out an operand, an E stage for executing the operation and a W stage for writing an operation result. The time corresponding to one clock is allocated to execution of each stage. Accordingly, the time corresponding to 5 clocks is needed to execute one instruction.

Further, the difference between the processor and the peripheral device as shown in FIG. 22 from those of FIG. 1 resides in that an instruction supply unit 20c is used in place of the instruction supply unit 20, and an interrupt control unit 50b is used in place of the interrupt control unit 50. The other aspects of the construction are the same as the first embodiment shown in FIG. 1.

Figure 23:
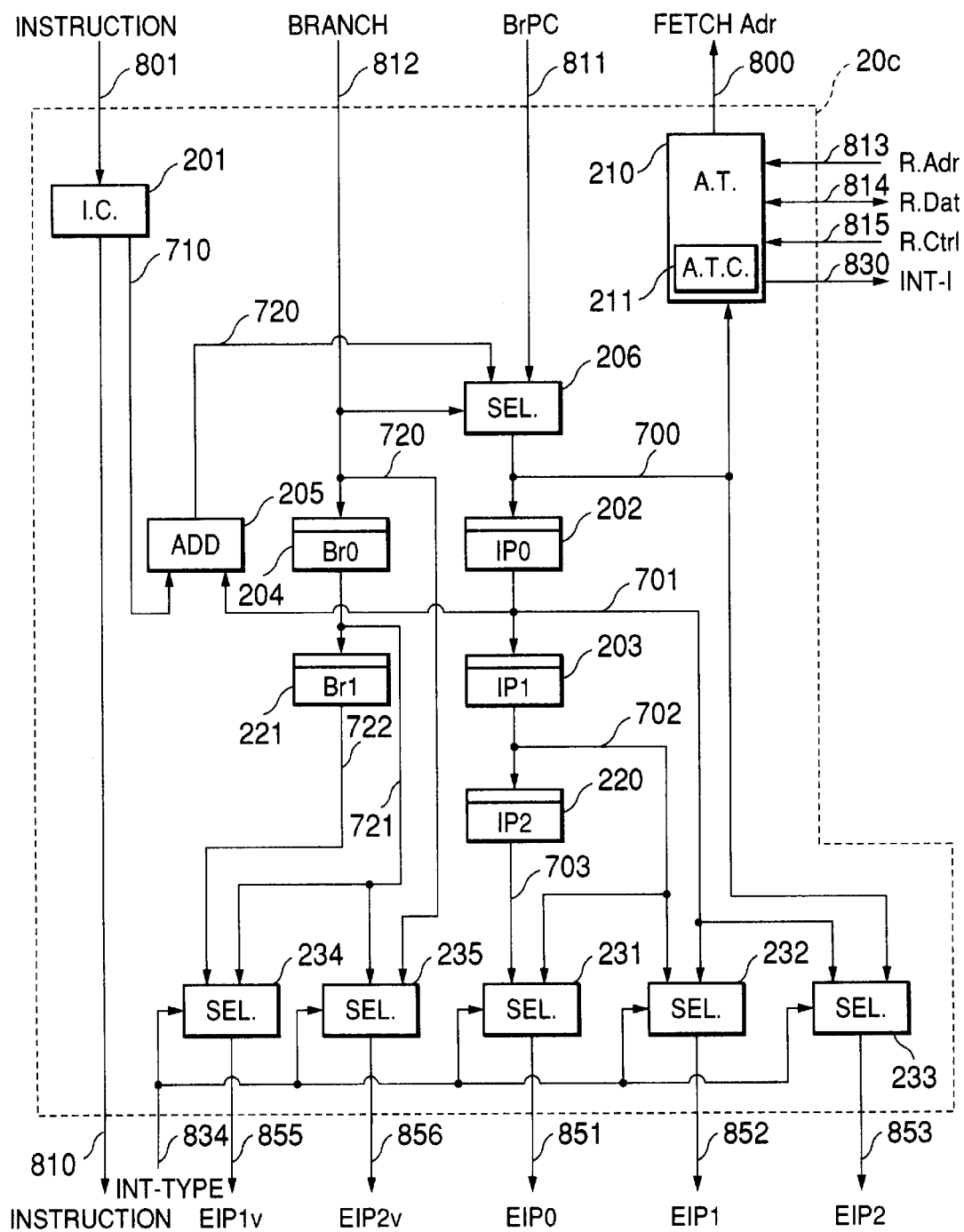
FIG. 23 is a schematic diagram showing an instruction supply unit 20c shown in FIG. 22.

FIG. 23 is a schematic diagram showing the instruction supply unit 20c shown in FIG. 22. In the following description, the elements having the same functions as those of FIG. 2 or FIG. 21 are represented by the same reference numerals.

The instruction supply unit 20c shown in FIG. 23 operates the selectors 231 to 235 as follows on the basis of the interrupt request which is notified from the interrupt control unit 50b through the interrupt signal line 834.

When it is notified from the interrupt control unit 50b that the interrupt occurs at the F stage, the selectors 231, 232, 233, 234 and 235 select the values on the signal line 702, the value on the signal line 701, the value on the signal line 700, the value on the signal line 721 and the value on the signal line 720.

When it is notified from the interrupt control unit 50b that the interrupt occurs in the R stage, the selectors 231, 232, 233, 234 and 235 select the value on the signal line 703, the value on the signal line 702, the value on the signal line 701, the value on the signal line 722 and the value on the signal line 721.

In the instruction supply unit 20c thus constructed, when an interrupt occurs, the virtual address of the instruction to be first executed after the interrupt processing is completed is output onto an address line 851, the virtual address of an instruction to be executed next to the instruction to be first executed after the interrupt processing is output onto an address line 852, and the virtual address of an instruction to be executed thirdly after the interrupt processing is completed is output onto an address line 835. Further, a value indicating whether the virtual address output onto the address line 852 is the virtual address of the instruction of the branch destination which is indicated by the branch instruction is output onto a signal line 855, and a value indicating whether the virtual address output onto the address line 853 is the virtual address of the instruction of the branch destination which is indicated by the branch instruction is output onto a signal line 856.

Figure 24:
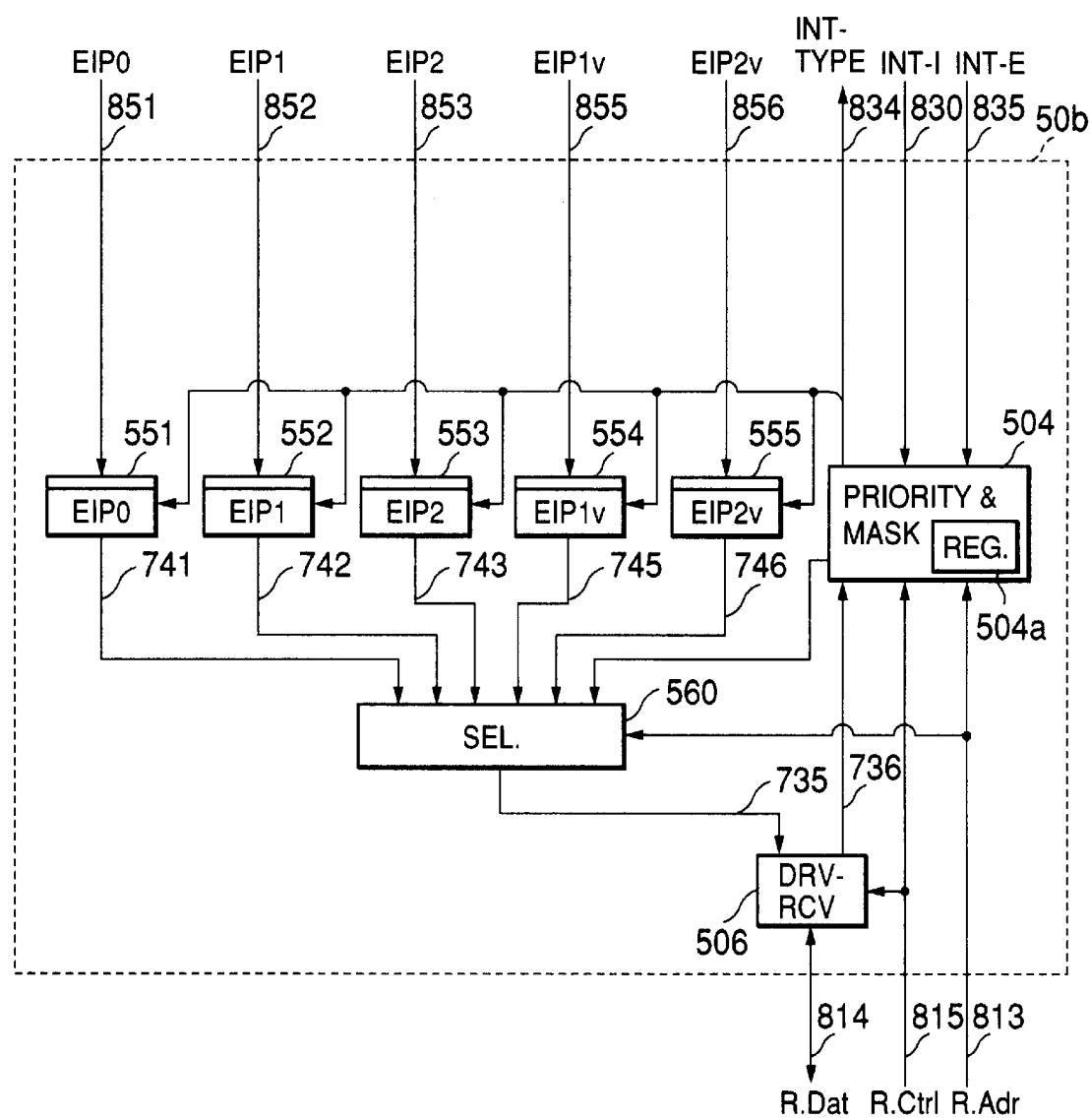
FIG. 24 is a schematic diagram showing an interrupt control unit 50b shown in FIG. 22.

FIG. 24 is a schematic diagram showing the interrupt control unit 50b shown in FIG. 22. In the following description, the elements having the same functions as shown in FIG. 3 are represented by the same reference numerals.

The interrupt control unit 50b shown in FIG. 24 stores the values transmitted from the selectors 231, 232, 233, 234 and 235 of the instruction supply unit 20c into registers 551, 552, 553, 554 and 555 respectively. The instruction executing unit 30 can access desired registers 551 to 555 by controlling a selector 560 and a bidirectional driver 506 through the identification signal line 813, the data signal line 814 and the control signal line 815.

Figure 25:
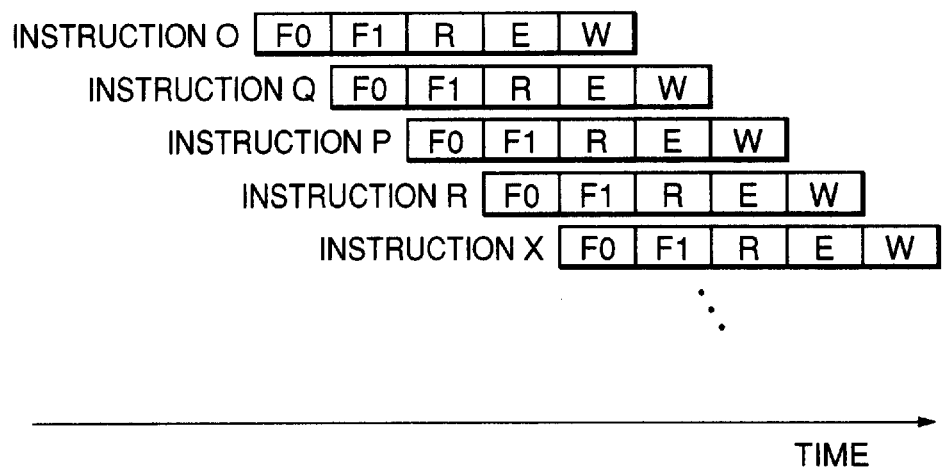
FIG. 25 is a diagram showing the flow of a pipeline when the processor shown in FIG. 22 executes the program shown in FIG. 4.

FIG. 25 shows the flow of the pipeline when the processor shown in FIG. 22 executes the program shown in FIG. 4. As in the case of the above-described embodiments, assuming that it is known in the R stage that the instruction under execution is the branch instruction, the two instructions, the instruction P and the instruction R which are subsequent instructions to the branch instruction Q are contained in the delay slot of the branch instruction Q.

FIG. 26 shows an example of the interrupt processing program which is processed by the processor shown in FIG. 22. The interrupt processing program is executed when the interrupt occurs in the instruction as in the case of the interrupt processing program of the first embodiment shown in FIG. 6. In FIG. 6, the maximum number of branch instructions which are continuously issued when the processing returns from the interrupt processing is equal to 2, however, in this case the maximum number is equal to 3 (see L11 of FIG. 26).

Figure 27:
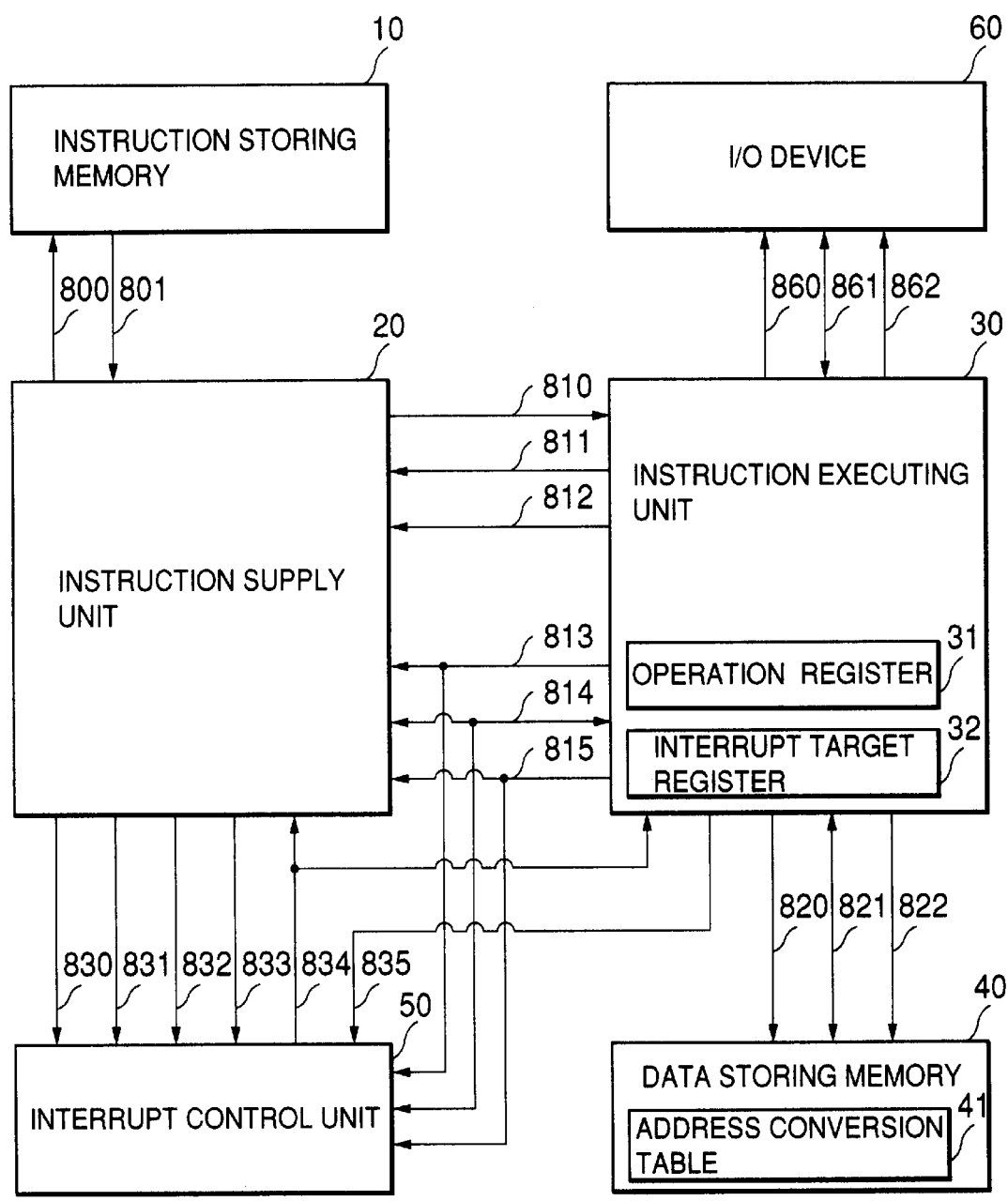
FIG. 27 is a diagram showing a system structure using the processor and the peripheral devices shown in FIG. 1.
Figures 28, 29:
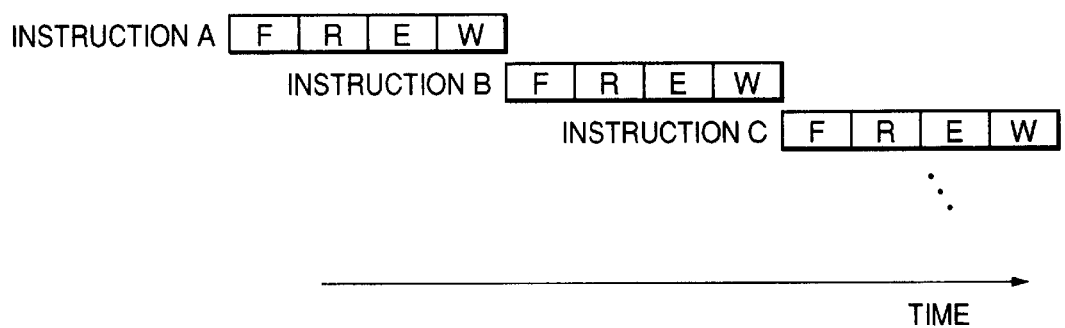
FIG. 28 shows a program which is executed by a processing unit.
FIG. 29 is a diagram showing the flow of a pipeline when a processing unit using no pipeline system executes the program shown in FIG. 28.
Figures 30, 31:
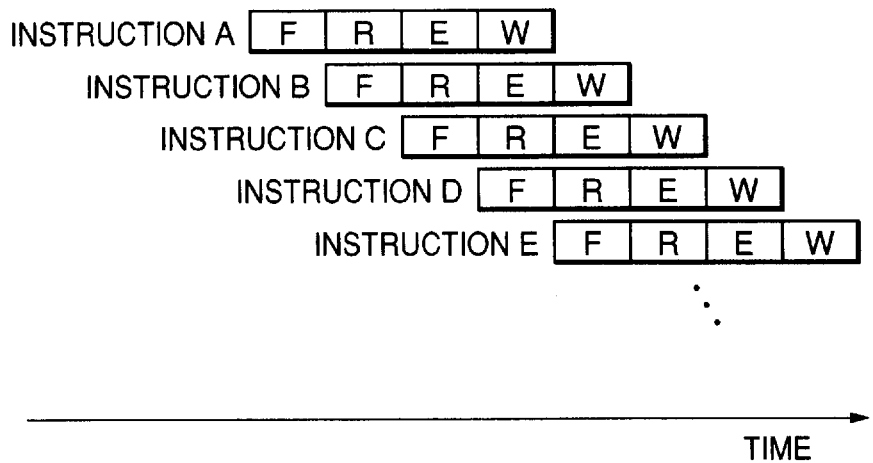
FIG. 30 is a diagram showing the flow of a pipeline when a processing unit adopting the pipeline system executes the program shown in FIG. 28.
FIG. 31 shows an example of a program which contains a branch instruction.
Figures 32, 33:
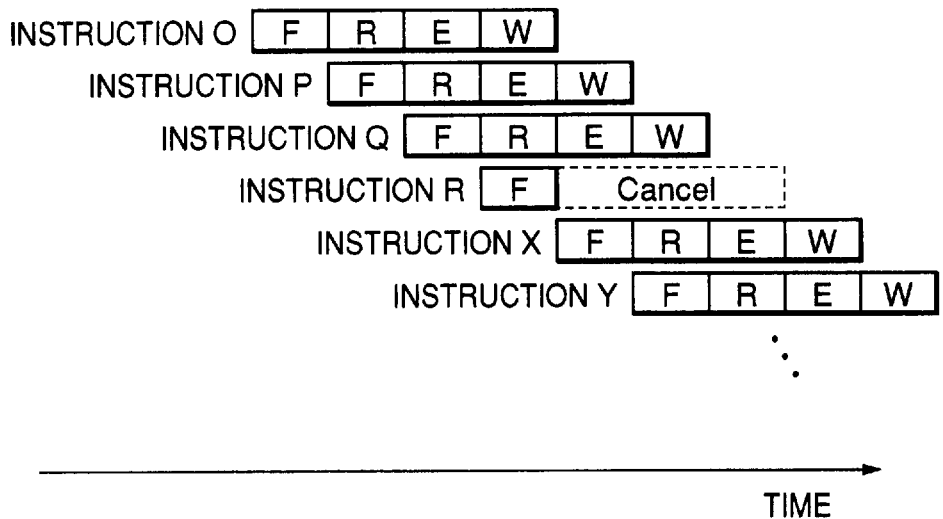
FIG. 32 is a diagram showing the flow of a pipeline when the processing unit adopting the pipeline system executes the program shown in FIG. 31.
FIG. 33 is a diagram showing a program containing an branch instruction having a delay slot.
Figure 34:
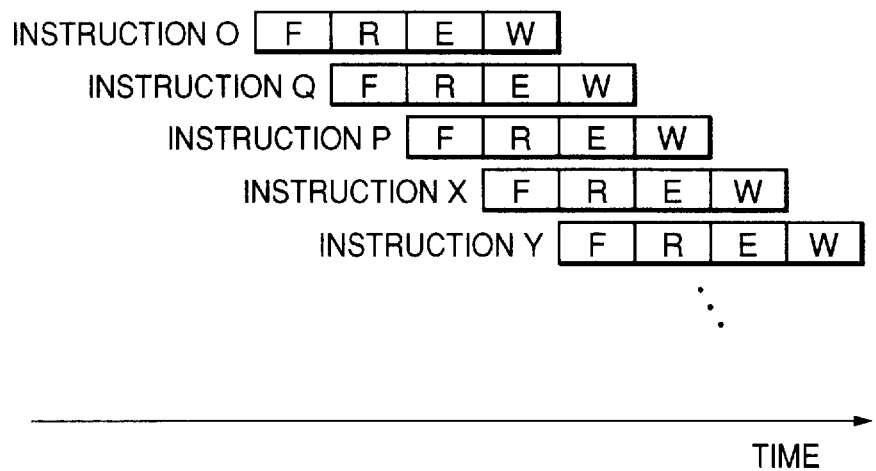
FIG. 34 is a diagram showing the flow of a pipeline when a pipeline type processing unit which is designed to support the delay branch.

Finally, FIG. 27 shows the construction of a system using the processor of the system according to the present invention. In FIG. 27, an I/O device 60 such as a keyboard, a display or the like is connected to the processor and the peripheral devices shown in FIG. 1. The instruction executing unit 30 accesses the I/O device 60 by using an address 860, a data line 861 and a control signal line 862 to control the operation of the I/O device 60.

As described above, according to the present invention, there can be provided a pipeline type processor and a computer system which can accurately perform interrupt processing regardless whether the interrupted instruction is contained in the delay slot even when an instruction having a variable instruction length is executed as in the case of CISC, VLIW after compression, etc.

What is claimed is:

1. A pipeline type processor for successively reading out and executing plural instructions, said plural instruction containing a branch instruction and being stored in a length-variable mode in a memory, including:

an instruction supply unit for successively reading out an instruction from the memory, and when the read-out instruction is the branch instruction, reading out an instruction at a branch target address indicated by the branch instruction after reading out a subsequent instruction contained in a delay slot of the branch instruction;

an instruction executing unit for executing the instruction read out by said instruction supply unit, and when the read-out instruction is the branch instruction, notifying the branch target address indicated by the branch instruction to said instruction supply unit; and an interrupt control unit for controlling, when an interrupt occurs, an instruction to be executed after returning from processing of the interrupt, wherein said interrupt control unit has a register for storing, when the interrupt occurs, addresses of instructions from an interrupted instruction until an instruction to be executed following the interrupted instruction and then following the number of instructions corresponding to the number of the instructions contained in the delay slot and successively reads out the addresses stored in said register from the address of the interrupted instruction after the processing of the interrupt is completed, and said instruction supply unit reads out the instruction of an address which is first read out from said register by the interrupt control unit and, with respect to each of the addresses of the second and subsequent instructions read out from said register by said interrupt control unit, branches, when the address is an address of an instruction indicated by the branch instruction, to the address to execute the instruction, and reads out, when the address is an address of an instruction other than the instruction indicated by the branch instruction, an instruction subsequent to the instruction being executed.

2. An interrupt control system which is used when plural instructions which contain a branch instruction stored in a storage device in a length-variable mode, are successively read out and are processed by a pipeline type processing unit, said pipeline type processing unit executing the branch instruction which has at least one instruction in a delay slot, including:

address storage means for storing, when an interrupt occurs, the addresses of instructions from an interrupted instruction until an instruction to be executed following the interrupted instruction and then following the number of instructions corresponding to the number of instructions contained in the delay slot;

address read-out means for successively reading out the addresses stored in said address storage means from the address of the interrupted instruction after processing of the interrupt has completed;

first instruction executing means which branches to the address which is first read out by said address read-out means to execute the instruction; and second instruction executing means, with respect to each of the addresses of the second and subsequent instructions read out by said address read-out means, branches, when the address is an address of an instruction indicated by the branch instruction, to the address to execute the instruction, and executes, when the address is an address of an instruction other than the instruction indicated by the branch instruction, an instruction subsequent to the instruction being executed.

3. The interrupt control system as claimed in claim 2, further including branch information storing means for storing, with respect to each of the instructions from an instruction to be executed next to the interrupted instruction until an instruction to be executed following the interrupted instruction and then following the number of the instructions corresponding to the number of instructions contained in the delay slot, information indicating whether an instruction, which was executed previously to the number of the instructions corresponding to the number of instructions contained in the delay slot before the instruction, is the branch instruction, wherein said second executing means makes a judgment, on the basis of the information stored in said branch information storing means, as to whether each of addresses which are read out secondly and subsequently by said address read-out means is the address of an instruction which is indicated by the branch instruction.

4. The interrupt control system as claimed in claim 2, further including address storage control means for controlling, with respect to each of instructions from an instruction to be executed soon after the interrupted instruction until an instruction to be executed following the interrupted instruction and then following the number of instructions corresponding to the number of instructions contained in the delay slot, to store an address having a special value as an address of the instruction into said address storing means, when an instruction, which was executed previously to the number of instructions corresponding to the number of instructions contained in the delay slot before the instruction, is not the branch instruction, wherein, with respect to each of addresses which are read out secondly and subsequently by said address read-out means, when the address is the special value, said second instruction executing means does not branch to the address.

5. The interrupt control system as claimed in claim 3, wherein said first instruction executing means executes a branch instruction which indicates an address which is first read out by said address read-out means as a jump destination, and said second instruction executing means, with respect to each of the addresses which are secondly and subsequently read out by said address read-out means, executes, when the address is an address of an instruction indicated by a branch instruction, the branch instruction indicating the address as a jump destination, and executes, when the address is an address of an instruction other than the instruction indicated by the branch instruction, a non-operation instruction which is a command indicating to do nothing.

6. The interrupt control system as claimed in claim 4, wherein said first instruction executing means executes a branch instruction which indicates an address which is first read out by said address read-out means as a jump destination, and said second instruction executing means, with respect to each of the addresses which are secondly and subsequently read out by said address read-out means, executes, when the address is an address of an instruction indicated by a branch instruction, the branch instruction indicating the address as a jump destination, and executes, when the address is an address of an instruction other than the instruction indicated by the branch instruction, a non-operation instruction which is a command indicating to do nothing.

7. The interrupt control system as claimed in claim 2, wherein said first instruction executing means executes a branch instruction which indicates an address which is first read out by said address read-out means as a jump destination, and said second instruction executing means, with respect to each of the addresses which are secondly and subsequently read out by said address read-out means, executes, when an address is the address of an instruction indicated by a branch instruction, the branch instruction indicating the address as a jump destination, and executes, when the address is an address of an instruction other than the instruction indicated by the branch instruction, a non-operation instruction which is a command indicating to do nothing.

8. The interrupt control system as claimed in claim 2, further including address generating means for adding, to the address of the instruction being executed, an instruction length of the instruction to generate the address of an instruction to be read out and executed next, wherein when the instruction length of the interrupted instruction is known at the time when the interrupt occurs, said second instruction executing means, with respect to the second address read out by said address read-out means, branches to the second address to execute the instruction even when the second address is an address of an instruction other than the instruction indicated by the branch instruction.

9. The interrupt control system as claimed in claim 8, further including branch information storing means for storing, with respect to each of the instructions from an instruction to be executed next to the interrupted instruction until an instruction to be executed following the interrupted instruction and then following the number of instructions corresponding to the number of instructions contained in the delay slot, information indicating whether an instruction, which was executed previously to the number of instructions corresponding to the number of instructions contained in the delay slot before the instruction, is the branch instruction, wherein, said second executing means makes a judgment, on the basis of the information stored in said branch information storing means, as to whether each of addresses which are read out secondly and subsequently by said address read-out means is the address of an instruction which is indicated by the branch instruction.

10. The interrupt control system as claimed in claim 8, further including address storage control means for controlling, with respect to each of the instructions from an instruction to be executed soon after the interrupted instruction until an instruction to be executed following the interrupted instruction and then following the number of the instructions corresponding to the number of instructions contained in the delay slot, to store an address having a special value as the address of the instruction into said address storing means, when an instruction, which was executed previously to the number of the instructions corresponding to the number of instructions contained in the delay slot before the instruction, is not the branch instruction, wherein, with respect to each of addresses which are read out secondly and subsequently by said address read-out means, when the address is the special value, said second instruction executing means does not branch to the address.

11. The interrupt control system as claimed in claim 9, wherein said first instruction executing means executes a branch instruction which indicates an address which is first read out by said address read-out means as a jump destination, and said second instruction executing means, with respect to each of the addresses which are secondly and subsequently read out by said address read-out means, executes, when the address is an address of an instruction indicated by a branch instruction, the branch instruction indicating the address as a jump destination, and executes, when the address is an address of an instruction other than the instruction indicated by the branch instruction, a non-operation instruction which is a command indicating to do nothing.

12. The interrupt control system as claimed in claim 10, wherein said first instruction executing means executes a branch instruction which indicates an address which is first read out by said address read-out means as a jump destination, and said second instruction executing means, with respect to each of the addresses which are secondly and subsequently read out by said address read-out means, executes, when the address is an address of an instruction indicated by a branch instruction, the branch instruction indicating the address as a jump destination, and executes, when the address is an address of an instruction other than the instruction indicated by the branch instruction, a non-operation instruction which is a command indicating to do nothing.

13. The interrupt control system as claimed in claim 8, wherein said first instruction executing means executes a branch instruction which indicates an address which is first read out by said address read-out means as a jump destination, and said second instruction executing means, with respect to each of the addresses which are secondly and subsequently read out by said address read-out means, executes, when the address is an address of an instruction indicated by a branch instruction, the branch instruction indicating the address as a jump destination, and executes, when the address is an address of an instruction other than the instruction indicated by the branch instruction, a non-operation instruction which is a command indicating to do nothing.

14. A computer system including the processor as claimed in claim 1, a memory for storing instructions in which plural instructions containing the branch instruction are stored in a length-variable mode, and an I/O device through which said processor is connected to an input/output device.

* * * * *

UNITED STATES PATENT AND TRADEMARK OFFICE
CERTIFICATE OF CORRECTION

PATENT NO. : 5,815,696
DATED : 29 September 1998
INVENTOR(S) : Kazuhiko Tanaka et al It is certified that error appears in the above-identified patent and that said Letters Patent is hereby corrected as shown below:

| Column | Line | |
|---|---|---|
| 1 | 56 | Delete "thereof". |
| 1 | 57 | Delete "thereof". |
| 2 | 37 | Before "routine" delete "the". |
| 2 | 44 | After "supporting" insert --a--. |
| 7 | 10 | Delete "a;". |
| 14 | 60 | Change "into-a" to --into a--. |
| 20 | 10 | Change "theores" to --stores--. |
| 22 | 52 | Delete "is". |

Signed and Sealed this

Seventh Day of December, 1999

Attest:

Q. TODD DICKINSON

Attesting Officer

Acting Commissioner of Patents and Trademarks